US010881133B2

(12) United States Patent
Dube et al.

(10) Patent No.: US 10,881,133 B2
(45) Date of Patent: Jan. 5, 2021

(54) TOBACCO-DERIVED CELLULOSIC SUGAR

(71) Applicant: R.J. REYNOLDS TOBACCO COMPANY, Winston-Salem, NC (US)

(72) Inventors: Michael Francis Dube, Winston-Salem, NC (US); Rhys Thomas Dale, West Lafayette, IN (US); Morrison Clark Dale, West Lafayette, IN (US); Jessica Hanna Johnston, West Lafayette, IN (US)

(73) Assignee: R.J. Reynolds Tobacco Company, Winston-Salem, NC (US)

( * ) Notice: Subject to any disclaimer, the term of this patent is extended or adjusted under 35 U.S.C. 154(b) by 660 days.

(21) Appl. No.: 14/688,522

(22) Filed: Apr. 16, 2015

(65) Prior Publication Data

US 2016/0302472 A1 Oct. 20, 2016

(51) Int. Cl.
*A24B 15/28* (2006.01)
*A24B 15/20* (2006.01)
(Continued)

(52) U.S. Cl.
CPC .............. *A24B 15/28* (2013.01); *A24B 15/10* (2013.01); *A24B 15/20* (2013.01); *A24D 1/00* (2013.01);
(Continued)

(58) Field of Classification Search
None
See application file for complete search history.

(56) References Cited

U.S. PATENT DOCUMENTS

| | | |
|---|---|---|
| 1,376,586 A | 5/1921 | Schwartz |
| 2,766,148 A | 10/1956 | Rowland |
| 2,774,680 A | 12/1956 | Hackney et al. |
| 3,424,171 A | 1/1969 | Rooker |
| 3,696,917 A | 10/1972 | Levi |
| 4,008,210 A | 2/1977 | Steele et al. |
| 4,009,290 A | 2/1977 | Okumori et al. |
| 4,045,879 A | 9/1977 | Witte |
| 4,056,442 A | 11/1977 | Huang et al. |
| 4,069,828 A | 1/1978 | Hall et al. |

(Continued)

FOREIGN PATENT DOCUMENTS

| | | |
|---|---|---|
| CN | 1133694 | 10/1996 |
| CN | 1324586 | 12/2001 |

(Continued)

OTHER PUBLICATIONS

"Enzyme Class Index: Hydrolases on esters", *Sigma-Aldrich*, 2014, [online], Retrieved from the Internet, [retrieved Oct. 21, 2014], URL http://www.sigmaaldrich.com/life-science/metabolomics/enzyme-explorer/class-index/hydrolases-on-esters.html.

(Continued)

*Primary Examiner* — Michael H. Wilson
*Assistant Examiner* — Katherine A Will
(74) *Attorney, Agent, or Firm* — Womble Bond Dickinson (US) LLP

(57) ABSTRACT

Methods of forming cellulosic sugars from the stalk or roots of a plant of the *Nicotiana* species are provided herein, the methods including i) receiving a tobacco material including at least one of a stalk material and a root material of a harvested plant of the *Nicotiana* species; ii) delignifying the tobacco material to form a tobacco-derived pulp; and iii) hydrolyzing the tobacco-derived pulp to form a hydrolyzed tobacco product including residual solids and a liquid including at least one tobacco-derived cellulosic sugar. A cellulosic sugar derived from hydrolyzed tobacco material including at least one of a tobacco stalk material and a tobacco root material of a harvested plant of the *Nicotiana* species is also provided herein. Tobacco products incorporating the cellulosic sugars derived from hydrolyzed tobacco material or products derived from the cellulosic sugar are also provided.

17 Claims, 4 Drawing Sheets

(51) Int. Cl.
  *C13K 13/00* (2006.01)
  *C13K 1/02* (2006.01)
  *C13K 11/00* (2006.01)
  *A24B 15/10* (2006.01)
  *A24D 1/00* (2020.01)

(52) U.S. Cl.
  CPC ............... *C13K 1/02* (2013.01); *C13K 11/00* (2013.01); *C13K 13/002* (2013.01); *Y02E 50/10* (2013.01)

(56) References Cited

U.S. PATENT DOCUMENTS

| | | |
|---|---|---|
| 4,122,104 A | 10/1978 | Witte |
| 4,144,895 A | 3/1979 | Fiore |
| 4,150,677 A | 4/1979 | Osborne, Jr. et al. |
| 4,244,381 A | 1/1981 | Lendvay |
| 4,251,671 A | 2/1981 | Alter et al. |
| 4,267,847 A | 5/1981 | Reid |
| 4,268,632 A | 5/1981 | Wildman et al. |
| 4,289,147 A | 9/1981 | Wildman et al. |
| 4,298,013 A | 11/1981 | Semp et al. |
| 4,298,540 A | 11/1981 | Youn et al. |
| 4,308,877 A | 1/1982 | Mattina |
| 4,322,569 A | 3/1982 | Chao et al. |
| 4,334,095 A | 6/1982 | Baniel |
| 4,347,324 A | 8/1982 | Wildman et al. |
| 4,351,346 A | 9/1982 | Brummer et al. |
| 4,359,059 A | 11/1982 | Brummer et al. |
| 4,359,417 A | 11/1982 | Karnofsky et al. |
| 4,381,407 A | 4/1983 | Bremus et al. |
| 4,456,556 A | 6/1984 | Grimsby |
| 4,456,557 A | 6/1984 | Grimsby |
| 4,466,923 A | 8/1984 | Friedrich |
| 4,476,881 A | 10/1984 | Gravely et al. |
| 4,506,682 A | 3/1985 | Muller |
| 4,513,756 A | 4/1985 | Pittman et al. |
| 4,515,726 A | 5/1985 | Sullivan |
| 4,528,993 A | 7/1985 | Sensabaugh, Jr. et al. |
| 4,589,428 A | 5/1986 | Keritsis |
| 4,605,016 A | 8/1986 | Soga et al. |
| 4,607,479 A | 8/1986 | Linden |
| 4,612,942 A | 9/1986 | Dobberstein et al. |
| 4,622,982 A | 11/1986 | Gaisch et al. |
| 4,624,269 A | 11/1986 | Story et al. |
| 4,631,899 A | 12/1986 | Nielsen |
| 4,716,911 A | 1/1988 | Poulose et al. |
| 4,727,889 A | 3/1988 | Niven, Jr. et al. |
| 4,847,106 A | 7/1989 | Pike et al. |
| 4,887,618 A | 12/1989 | Bernasek et al. |
| 4,895,175 A | 1/1990 | Baskevitch et al. |
| 4,941,484 A | 7/1990 | Clapp et al. |
| 4,967,771 A | 11/1990 | Fagg et al. |
| 4,967,773 A | 11/1990 | Shaw |
| 4,986,286 A | 1/1991 | Roberts et al. |
| 4,987,907 A | 1/1991 | Townend |
| 4,991,599 A | 2/1991 | Tibbetts |
| 5,005,593 A | 4/1991 | Fagg |
| 5,018,540 A | 5/1991 | Grubbs et al. |
| 5,060,669 A | 10/1991 | White et al. |
| 5,065,775 A | 11/1991 | Fagg |
| 5,074,319 A | 12/1991 | White et al. |
| 5,077,071 A | 12/1991 | Strop |
| 5,092,352 A | 3/1992 | Sprinkle, III et al. |
| 5,099,862 A | 3/1992 | White et al. |
| 5,110,605 A | 5/1992 | Acharya |
| 5,121,757 A | 6/1992 | White et al. |
| 5,131,415 A | 7/1992 | Munoz et al. |
| 5,143,097 A | 9/1992 | Sohn et al. |
| 5,148,819 A | 9/1992 | Fagg |
| 5,159,942 A | 11/1992 | Brinkley et al. |
| 5,167,244 A | 12/1992 | Kjerstad |
| 5,197,494 A | 3/1993 | Kramer |
| 5,230,354 A | 7/1993 | Smith et al. |
| 5,234,008 A | 8/1993 | Fagg |
| 5,235,992 A | 8/1993 | Sensabaugh, Jr. |
| 5,243,999 A | 9/1993 | Smith |
| 5,296,621 A | 3/1994 | Roos et al. |
| 5,301,694 A | 4/1994 | Raymond et al. |
| 5,318,050 A | 6/1994 | Gonzalez-Parra et al. |
| 5,343,879 A | 9/1994 | Teague |
| 5,346,734 A | 9/1994 | Wydick, Jr. |
| 5,360,022 A | 11/1994 | Newton et al. |
| 5,387,416 A | 2/1995 | White et al. |
| 5,397,571 A | 3/1995 | Roland et al. |
| 5,426,220 A | 6/1995 | Baniel et al. |
| 5,435,325 A | 7/1995 | Clapp et al. |
| 5,445,169 A | 8/1995 | Brinkley et al. |
| 5,533,530 A | 7/1996 | Young et al. |
| 5,715,844 A | 2/1998 | Young et al. |
| 5,724,998 A | 3/1998 | Gellatly et al. |
| 5,733,574 A | 3/1998 | Dam |
| 5,859,263 A | 1/1999 | Ghorpade et al. |
| 5,932,095 A | 8/1999 | Walters et al. |
| 6,083,729 A | 7/2000 | Martin et al. |
| 6,131,584 A | 10/2000 | Lauterbach |
| 6,162,516 A | 12/2000 | Derr |
| 6,216,706 B1 | 4/2001 | Kumar et al. |
| 6,225,483 B1 | 5/2001 | Franke |
| 6,248,760 B1 | 6/2001 | Wilhelmsen |
| 6,262,284 B1 | 7/2001 | Khachik |
| 6,280,761 B1 | 8/2001 | Santus |
| 6,298,858 B1 | 10/2001 | Coleman, III et al. |
| 6,298,859 B1 | 10/2001 | Kierulff et al. |
| 6,325,860 B1 | 12/2001 | Coleman, III |
| 6,403,126 B1 | 6/2002 | Webster et al. |
| 6,414,172 B1 | 7/2002 | Garcés et al. |
| 6,417,157 B1 | 7/2002 | Wadsworth et al. |
| 6,428,624 B1 | 8/2002 | Coleman, III et al. |
| 6,440,223 B1 | 8/2002 | Dube et al. |
| 6,495,175 B2 | 12/2002 | Rao et al. |
| 6,499,489 B1 | 12/2002 | Coleman, III |
| 6,504,085 B1 | 1/2003 | Howard |
| 6,591,841 B1 | 7/2003 | White et al. |
| 6,668,839 B2 | 12/2003 | Williams |
| 6,676,959 B1 | 1/2004 | Andersson et al. |
| 6,695,924 B1 | 2/2004 | Dube et al. |
| 6,772,767 B2 | 8/2004 | Mua et al. |
| 6,800,318 B2 | 10/2004 | Kapila et al. |
| 6,834,654 B2 | 12/2004 | Williams |
| 6,860,998 B1 | 3/2005 | Wilde |
| 6,895,974 B2 | 5/2005 | Peele |
| 6,953,040 B2 | 10/2005 | Atchley et al. |
| 7,025,066 B2 | 4/2006 | Lawson et al. |
| 7,032,601 B2 | 4/2006 | Atchley et al. |
| 7,067,718 B2 | 6/2006 | Anai et al. |
| 7,074,449 B1 | 7/2006 | Holley et al. |
| 7,156,981 B2 | 1/2007 | Wilde et al. |
| 7,179,930 B2 | 2/2007 | Bhaskaran et al. |
| 7,198,808 B2 | 4/2007 | Krasutsky et al. |
| 7,271,298 B2 | 9/2007 | Xu et al. |
| 7,337,782 B2 | 3/2008 | Thompson |
| 7,351,424 B2 | 4/2008 | Ornelas-Cravioto et al. |
| 7,374,779 B2 | 5/2008 | Chen et al. |
| 7,615,657 B2 | 11/2009 | Bathurst et al. |
| 7,622,599 B2 | 11/2009 | Swaminathan et al. |
| 7,629,007 B2 | 12/2009 | Peña |
| 7,638,314 B2 | 12/2009 | Zappi et al. |
| 7,652,167 B2 | 1/2010 | Miller et al. |
| 7,667,068 B2 | 2/2010 | Miller et al. |
| 7,671,242 B2 | 3/2010 | Losso et al. |
| 7,694,686 B2 | 4/2010 | Atchley et al. |
| 7,726,320 B2 | 6/2010 | Robinson et al. |
| 7,741,500 B2 | 6/2010 | Arhancet et al. |
| 7,810,507 B2 | 10/2010 | Dube et al. |
| 7,820,419 B2 | 10/2010 | Smith et al. |
| 7,861,728 B2 | 1/2011 | Holton, Jr. et al. |
| 7,901,512 B2 | 3/2011 | Quinter et al. |
| 7,910,209 B2 | 3/2011 | Uchida et al. |
| 7,943,350 B2 | 5/2011 | Vlasenko et al. |
| 8,061,362 B2 | 11/2011 | Mua et al. |
| 8,236,929 B2 | 8/2012 | Cheryan et al. |
| 8,247,423 B2 | 8/2012 | Estok et al. |
| 8,360,072 B2 | 1/2013 | Krauss |

(56) References Cited

U.S. PATENT DOCUMENTS

| | | |
|---|---|---|
| 8,389,749 B2 | 3/2013 | Dumesic et al. |
| 8,695,609 B2 | 4/2014 | Dube et al. |
| 8,758,561 B2 | 6/2014 | Dittrich et al. |
| 8,807,141 B2 | 8/2014 | Breslin et al. |
| 8,893,725 B2 | 11/2014 | Dube et al. |
| 2001/0016593 A1 | 8/2001 | Wilhelmsen |
| 2002/0197688 A1 | 12/2002 | Pandolfino |
| 2004/0020503 A1 | 2/2004 | Williams |
| 2004/0101543 A1 | 5/2004 | Liu et al. |
| 2004/0118422 A1 | 6/2004 | Lundin et al. |
| 2004/0173228 A1 | 9/2004 | Coleman, III |
| 2005/0061339 A1 | 3/2005 | Hansson et al. |
| 2005/0066986 A1 | 3/2005 | Nestor et al. |
| 2005/0115580 A1 | 6/2005 | Quinter et al. |
| 2005/0143464 A1 | 6/2005 | Matsuyama et al. |
| 2005/0147722 A1 | 7/2005 | Fan et al. |
| 2005/0244521 A1 | 11/2005 | Strickland et al. |
| 2006/0003036 A1 | 1/2006 | Shaath et al. |
| 2006/0120974 A1 | 6/2006 | Mcneight |
| 2006/0191548 A1 | 8/2006 | Strickland et al. |
| 2006/0198873 A1 | 9/2006 | Chan et al. |
| 2007/0007069 A1 | 1/2007 | Hamasaki et al. |
| 2007/0062549 A1 | 3/2007 | Holton, Jr. et al. |
| 2007/0137663 A1 | 6/2007 | Taylor et al. |
| 2007/0186942 A1 | 8/2007 | Strickland et al. |
| 2007/0193596 A1 | 8/2007 | Mori et al. |
| 2007/0277432 A1 | 12/2007 | Jackam et al. |
| 2008/0020050 A1 | 1/2008 | Chau et al. |
| 2008/0029110 A1 | 2/2008 | Dube et al. |
| 2008/0029116 A1 | 2/2008 | Robinson et al. |
| 2008/0029117 A1 | 2/2008 | Mua et al. |
| 2008/0173317 A1 | 7/2008 | Robinson et al. |
| 2008/0196730 A1 | 8/2008 | Engstrom et al. |
| 2008/0209586 A1 | 8/2008 | Nielsen et al. |
| 2008/0305216 A1 | 12/2008 | Crawford et al. |
| 2009/0025738 A1 | 1/2009 | Mua et al. |
| 2009/0025739 A1 | 1/2009 | Brinkley et al. |
| 2009/0028803 A1 | 1/2009 | Mishra et al. |
| 2009/0065013 A1 | 3/2009 | Essen et al. |
| 2009/0081291 A1 | 3/2009 | Gin et al. |
| 2009/0234146 A1 | 9/2009 | Cooney et al. |
| 2009/0293889 A1 | 12/2009 | Kumar et al. |
| 2009/0293895 A1 | 12/2009 | Axelsson et al. |
| 2010/0004294 A1 | 1/2010 | Axelsson et al. |
| 2010/0017916 A1 | 1/2010 | Pappan et al. |
| 2010/0018540 A1 | 1/2010 | Doolittle et al. |
| 2010/0018541 A1 | 1/2010 | Gerardi et al. |
| 2010/0037903 A1 | 2/2010 | Coleman, III et al. |
| 2010/0058655 A1 | 3/2010 | Fogher |
| 2010/0196980 A1 | 8/2010 | Smith et al. |
| 2010/0197029 A1 | 8/2010 | O'Fallon et al. |
| 2010/0239726 A1 | 9/2010 | Pertsovich |
| 2010/0282267 A1 | 11/2010 | Atchley |
| 2010/0286420 A1 | 11/2010 | Akatsuka et al. |
| 2010/0291245 A1 | 11/2010 | Gao et al. |
| 2011/0083683 A1 | 4/2011 | Krauss |
| 2011/0139164 A1 | 6/2011 | Mua et al. |
| 2011/0174323 A1 | 7/2011 | Coleman, III et al. |
| 2011/0247640 A1 | 10/2011 | Beeson et al. |
| 2011/0259353 A1 | 10/2011 | Coleman, III et al. |
| 2011/0315154 A1 | 12/2011 | Mua et al. |
| 2012/0037175 A1 | 2/2012 | Cantrell et al. |
| 2012/0040408 A1 | 2/2012 | Decker et al. |
| 2012/0055494 A1 | 3/2012 | Hunt et al. |
| 2012/0103353 A1 | 5/2012 | Sebastian et al. |
| 2012/0125354 A1 | 5/2012 | Byrd et al. |
| 2012/0138073 A1 | 6/2012 | Cantrell et al. |
| 2012/0138074 A1 | 6/2012 | Cantrell et al. |
| 2012/0141648 A1 | 6/2012 | Morton et al. |
| 2012/0152265 A1 | 6/2012 | Dube et al. |
| 2012/0192880 A1 | 8/2012 | Dube et al. |
| 2012/0211016 A1 | 8/2012 | Byrd, Jr. et al. |
| 2012/0260929 A1* | 10/2012 | Coleman ............... A24B 15/24 131/353 |
| 2012/0272976 A1 | 11/2012 | Byrd et al. |
| 2012/0312314 A1 | 12/2012 | Plakidis et al. |
| 2013/0008457 A1 | 1/2013 | Zheng et al. |
| 2013/0014771 A1 | 1/2013 | Coleman, III et al. |
| 2013/0125907 A1 | 5/2013 | Dube et al. |
| 2013/0213417 A1 | 8/2013 | Chong et al. |
| 2013/0255702 A1 | 10/2013 | Griffith, Jr. et al. |
| 2013/0276801 A1 | 10/2013 | Byrd, Jr. et al. |
| 2014/0000638 A1 | 1/2014 | Sebastian et al. |
| 2014/0060554 A1 | 3/2014 | Collett et al. |
| 2014/0096780 A1 | 4/2014 | Gerardi |
| 2014/0096781 A1 | 4/2014 | Sears et al. |
| 2014/0096782 A1 | 4/2014 | Ampolini et al. |
| 2014/0190497 A1 | 7/2014 | Dube et al. |
| 2014/0256829 A1 | 9/2014 | Junker |
| 2014/0271951 A1* | 9/2014 | Mua ..................... A24B 15/241 424/751 |
| 2014/0271952 A1 | 9/2014 | Mua et al. |
| 2014/0273118 A1* | 9/2014 | Held ..................... C07C 45/60 435/136 |
| 2015/0040922 A1 | 2/2015 | Dube et al. |
| 2015/0059780 A1 | 3/2015 | Davis et al. |
| 2015/0201669 A1 | 7/2015 | Junker et al. |
| 2016/0201102 A1* | 7/2016 | Zhu ..................... C12P 19/02 435/68.1 |
| 2016/0257982 A1* | 9/2016 | Del Rio ............... C12P 7/56 |
| 2016/0376246 A1* | 12/2016 | Delcroix ............... C07G 1/00 549/427 |

FOREIGN PATENT DOCUMENTS

| | | |
|---|---|---|
| CN | 101262786 | 9/2008 |
| CN | 101450897 | 6/2009 |
| CN | 101801188 | 8/2010 |
| CN | 102079704 | 6/2011 |
| CN | 10218366 | 9/2011 |
| EP | 0 244 208 | 11/1987 |
| GB | 996141 | 6/1965 |
| GB | 1 202 821 | 8/1970 |
| GB | 2 020 538 A | 11/1979 |
| JP | 59-28465 A | 2/1984 |
| JP | H08-266260 | 10/1996 |
| JP | 1162008 | 10/1997 |
| JP | H11-308987 | 11/1999 |
| JP | H11-332408 | 12/1999 |
| JP | 2003024096 | 1/2003 |
| JP | 2009527488 | 7/2009 |
| KR | 930003904 | 5/1993 |
| KR | 10-2006-0054728 | 5/2006 |
| KR | 1020120022238 | 3/2012 |
| KR | 101233116 | 2/2013 |
| WO | WO 02/083191 | 10/2002 |
| WO | WO 2004/095959 | 11/2004 |
| WO | WO 2005/004480 | 1/2005 |
| WO | WO 2005/016036 | 2/2005 |
| WO | WO 2005/027892 | 3/2005 |
| WO | WO 2005/041699 | 5/2005 |
| WO | WO 2005/063060 | 7/2005 |
| WO | WO 2007/104573 | 9/2007 |
| WO | WO 2008/092207 | 8/2008 |
| WO | WO 2009/015142 | 1/2009 |
| WO | WO 2009/075762 | 6/2009 |
| WO | WO 2009/110775 A1 | 9/2009 |
| WO | WO 2010/054198 A2 | 5/2010 |
| WO | WO 2010/093229 | 8/2010 |
| WO | WO 2010/132444 | 11/2010 |
| WO | WO 2013/158957 | 10/2013 |

OTHER PUBLICATIONS

Akpinar et al., "Enzymatic Production of Xylooligosaccharide from Selected Agricultural Wastes," *Food and Bioproducts Processing*, 2009, pp. 145-151, vol. 87.

Alonso et al., "Integrated Conversion of Hemicellulose and Cellulose from Lignocellulosic Biomass," *Energy & Environmental Science*, 2013, vol. 6, pp. 76-80.

(56) References Cited

OTHER PUBLICATIONS

Brandt et al., "Practical Aspects of Preparative HPLC in Pharmaceutical and Development Production", *LC GC Europe*, Mar. 2002, pp. 2-5.

Bryzgalov et al., "Comparative Life Cycle Assessment of General Loose and Portion Snus", *IN1800 Life Cycle Assessment*, May 26, 2005, pp. 3-23.

Chu et al., "Fatty Acid Composition in Tobacco, I. Green Tobacco Plants", *Plant Physiology*, American Society of Plant Biologists, Mar. 1968, pp. 428-433, vol. 43(3), [online], retrieved from the internet, [retrieved Jun. 24, 2015], URL:http://www.ncbi.nlm.nih.gov/pmc/articles/PMC1086856/.

Clark et al., "Derivatization Solid-Phase Microextraction Gas Chromatographic-Mass Spectrometric Determination of Organic Acids in Tobacco"; 1997; Journal of Chromatographic Science; vol. 35; pp. 209-212.

Coleman, III et al., "Headspace Solid-Phase Microextraction Analysis of Artificial Flavors" *J. Sci. Food Agric.*, pp. 2645-2654, vol. 85.

Coleman, III et al., "The Use of a Non-Equilibrated Solid Phase Microextraction Method to Quantitatively Determine the Off-Notes in Mint and Other Essential Oils", *J. Sci. Food Agric.*, 2004, pp. 1223-1228, vol. 84.

Crabbe et al., "Biodiesel Production of Crude Palm Oil and Evaluation of Butanol Extraction and Fuel Properties," *Process Biochemistry*, 37, 65-71, (2001).

Ejikeme et al., "Catalysis in Biodiesel Production by Trans-Esterification Processes: An Insight," *Journal Chemistry*, 7, 1120-1132 (2010).

Freedman et al., "Trans-Esterification Kinetics of Soybean Oil," *JAOCS*, 63, 1375-1380 (1986).

Frega et al., "Chemical composition of Tobacco Seeds (*Nicotiana tabacum* L.)," *JAOCS*, 1991, pp. 20-33, vol. 68(1).

Giannelos et al., "Tobacco Seed Oil as an Alternative Diesel Fuel: Physical and Chemical Properties", *Industrial Crops and Products*, 2002, vol. 16, pp. 1-9.

Ishikawa et al., "Water-Soluble Constituents of Dill", *Chem. Pharm. Bull.*, 2002, pp. 501-507, vol. 50, No. 4.

Kodama et al., "Isolation of a New Terpene Glucoside, 3-Hydroxy-5,6-epoxy-β-ionyl-β-D-glucopyranoside from Flue-cured Tobacco", *Agric. Biol. Chem.*, 1981, pp. 941-944, vol. 45, No. 4.

Kolah et al. (2008), "Triethyl Citrate Synthesis by Reactive Distillation," *Industrial and Engineering Chemistry Research*, vol. 47, No. 4, pp. 1017-1024.

Kolah et al. "Reaction Kinetics of the Catalytic Esterification of Citric Acid with Ethanol", 2007; Industrial Engineering and Chemistry Research; vol. 46; pp. 3180-3187; American Chemical Society.

Leffingwell & Associates, Ester Detection Thresholds and Molecular Structures, www.leffingwell.com/esters, downloaded Sep. 23, 2015.

Leffingwell et al., "Tobacco Flavoring for Smoking Products", *R. J. Reynolds Tobacco Company*, 1972, pp. 1-72.

Li et al. Nanfang Nongye Xuebao. 2012. vol. 43, No. 8, pp. 1158-1163. CAPLUS Abstract enclosed.

Liu et al. J. Henan Agricult. Sci. 2012. vol. 41, No. 9, pp. 50-52. CAPLUS Abstract enclosed.

Loughrin et al., "Glycosidically Bound Volatile Components of *Nicotiana sylvestris* and *N. suaveolens* Flowers", *Phytochemistry*, 1992, pp. 1537-1540, vol. 31, No. 5.

Loughrin et al., "Headspace Compounds from Flowers of *Nicotiana tabacum* and Related Species", *J. Agric. Food Chem.*, 1990, vol. 38, No. 2, pp. 455-460.

Marchetti, J.M., et al., "Possible Methods for Biodiesel Production," Renewable and Sustainable Energy Review, 2007, pp. 1300-1311, 11(6).

Matsumura et al., "Water-Soluble Constituents of Caraway: Carvone Derivatives and their Glucosides", *Chem. Pharm. Bull.*, 2002, pp. 66-72, vol. 50, No. 1.

Matsuzaki et al., "Novel Glycerolipids and Glycolipids from the Surface Lipids of Nicotiana Benthamiana," *Biosci. Biotech. Biochem.*, Mar. 1992, pp. 1565-1569, vol. 56(10).

Moldoveanu et al., "Dual Analysis of Triglycerides from Certain Common Lipids and Seed Extracts," *J. Agric.Food Chem.*, 59, 2137-2147 (2011).

Moldoveanu, "5. Profiling of lipids from fruit and seed extracts", Lipidomics: Sea Food, Marine Based Dietary Supplement, *Fruit and Seed*, 2012: pp. 73-123, Ed. Su Chen [online], Retrieved from the Internet, [retrievedOct. 21, 2014], URL:http://www.tmres.com/ebook/uploads/suchencontent/T_13743193085%20Su%20Chen.pdf.

Mukhtar et al., "Fatty Acid Composition of Tobacco Seed Oil and Synthesis of Alkyd Resin", *Chin. J. of Chem.*, 2007, vol. 25, No. 5, pp. 705-708.

Ochiai, N., "6 Times Faster Screening of Pesticide Multi-Residues in Aqueous Samples Take Two!" *Gerstel Solutions Worldwide*, 2006, pp. 17-19, No. 6.

Patel et al., "Production Potential and Quality Aspects of Tobacco Seed Oil", *Tob. Res.*, 1998, vol. 24, No. 1, pp. 44-49.

Perflavory Information System, www.perflavory.com, downloaded Sep. 23, 2015.

Raguso et al., "Fragrance Chemistry, Nocturnal Rhythms and Pollination "Syndromes" in *Nicotiana*", *Phytochemistry*, 2003, pp. 265-284, vol. 63.

Ralph et al., "NMR Characterization of Altered Lignins Extracted from Tobacco Plants Down-Regulated for Lignification Enzymes Cinnamyl-Alcohol Dehydrogenase and Cinnamolyl-CoA Reductase," *Proceedings of the National Academy of Sciences*, 1998, vol. 95, pp. 12803-12808, http://www.ncbi.nlm.nih.gov/pmc/articles/PMC23601/.

Sadecka, et al.; Determination of organic acids in tobacco by capillary isotachophoresis; 2003; Journal of Chromatography A; vol. 988; pp. 161-165; Elsevier Science B.V.

Sahraoui et al., "Improved Microwave Steam Distillation Apparatus for Isolation of Essential Oils Comparison with Conventional Steam Distillation", *J. Chromatogr. A.*, 2008, pp. 229-233.

Satynaryana Murthy, "Performance of Tobacco Oil Based Bio-Diesel Fuel in a Single cylinder Direct Injection Engine," *International J. Physical Sci.*, 5, 2066-2074 (2010).

Schuchardt et al., "Trans-Esterification of Vegetable Oils: A Review," Chem. Soc., 9, 199-210 (1998).

Shmuk (1934), "The Method of Determination of Citric and Malic Acids in Tobacco and Makhorka" Ibid., pp. 247-251.

Shmuk et al. (1930), "Investigation of the Tobacco Acids," in Works of Academician A.A. Shmuk, vol. III, The Chemistry and Technology of Tobacco (Moscow: Pishchepromidzat, 1953; Jerusalem: trans. Lengy et al., Israel Program for Scientific Translations, 1961), pp. 136-144.

Shmuk et al. (1933), "Tobacco and Makhorka as Raw Materials for the Production of Citric Acid," in Works, op. cit., pp. 688-707.

Snook et al., "The Flower Flavonols of *Nicotiana* Species", *Phytochemistry*, 1992, pp. 1639-1647, vol. 31, No. 5.

Stanesh, *Biochemistry*, Chapter 6. Lipids and Membranes, Springer Science+Business Media, 1998, pp. 141-144.

Stanisavljevic et al., "Comparison of techniques for the Extraction of Tobacco Seed Oil", *Eur. J. Lipid Sci. Technol.*, 2009, vol. 111, pp. 513-518.

Stanisavljević et al., "Ultrasonic extraction of oil from tobacco (*Nicotiana tabacum* L.) seeds", *Ultrasonics Sonochemistry*, 2007, pp. 646-652, vol. 14, No. 5.

Tienpont et al., "Stir Bar Sorptive Extraction-Thermal Desorption-Capillary GC-MS Applied to Biological Fluids", *Anal. Bioanal. Chem..*, 2002, pp. 46-55, vol. 373.

TSO (1972), Physiology and Biochemistry of Tobacco Plants (Stroudsburg: Dowden, Hutchinson and Ross), p. 205.

TurboVap® II brochure, Biotage, 2010, [online], retrieved from the Internet, [retrieved Dec. 1, 2015], URL:http://www.google.com/url?sa=t&rct=j&q=&esrc=s&source=web&cd=11&ved=0ahUKEwiKyOzth7vJAhULx2MKHQYRA1IQFghKMAo&url=http%3A%2F%2Fwww.uniscience.com.br%2Fcornates-fluorescentes-de-membrana-biotium%2Fdioc5-3-3-3-dipentyloxacarbocyanine-iodide-bio . . . .

Veljkovic, V. B., et al., "Biodiesel Production from Tobacco Seed Oil with a High Content of Free Fatty Acids," *Fuel*, 2006, pp. 2671-2675, vol. 85(17).

(56) References Cited

OTHER PUBLICATIONS

Vickery et al. The Non-Volatile Organic Acids of Green Tobacco Leaves; 1931; Journal of Biological Chemistry; vol. 90; pp. 637-653.
Winayanuwattikun, P., et al., "Potential Plant Oil Feedstock for Lipase-Catalyzed Biodiesel Production in Thailand," Biomass and Bioenergy, 2008, pp. 1279-1286, vol. 32(12).
Wu et al. Yunnan Nongye Daxue Xuebao. 2013. vol. 28, No. 3, pp. 353-359. CAPLUS Abstract enclosed.
Xi et al. Yancao Keji. 2011. vol. 5, pp. 29-33. CAPLUS Abstract enclosed.
Zhang et al., "Advances in the Catalytic Production and Utilization of Sorbitol," *Industrial & Engineering Chemistry Research*, 2013, vol. 52, p. 11799-11815.
Zhang, Yi-Heng Percival et al., "Toward an Aggregated Understanding of Enzymatic Hydrolysis of Cellulose: Noncomplexed Cellulase Systems," Wiley InterScience. Biotechnology and Bioengineering, vol. 88, No. 7, Dec. 30, 2004, p. 797-824.
Ziaie-Shirkolaee et al. "Study on Cellulose Degradation During Organosolv Delignification of Wheat Straw and Evaluation of Pulp Properties," *Iranian Polymer Journal*, 2007, pp. 83-96, vol. 16(2).

\* cited by examiner

TOBACCO-DERIVED CELLULOSIC SUGAR

FIELD OF THE INVENTION

The present invention relates to products made or derived from tobacco, or that otherwise incorporate tobacco or components of tobacco. Of particular interest are ingredients or components obtained or derived from the stalk or roots of a plant of the *Nicotiana* species.

BACKGROUND OF THE INVENTION

Cigarettes, cigars, and pipes are popular smoking articles that employ tobacco in various forms. Such smoking articles are employed by heating or burning tobacco to generate aerosol (e.g., smoke) that may be inhaled by the smoker. Popular smoking articles, such as cigarettes, have a substantially cylindrical rod shaped structure and include a charge, roll or column of smokable material such as shredded tobacco (e.g., in cut filler form) surrounded by a paper wrapper thereby forming a so-called "tobacco rod." Normally, a cigarette has a cylindrical filter element aligned in an end-to-end relationship with the tobacco rod. Typically, a filter element comprises plasticized cellulose acetate tow circumscribed by a paper material known as "plug wrap." Certain cigarettes incorporate a filter element having multiple segments, and one of those segments can comprise activated charcoal particles. Typically, the filter element is attached to one end of the tobacco rod using a circumscribing wrapping material known as "tipping paper." It also has become desirable to perforate the tipping material and plug wrap, in order to provide dilution of drawn mainstream smoke with ambient air. A cigarette is employed by a smoker by lighting one end thereof and burning the tobacco rod. The smoker then receives mainstream smoke into his/her mouth by drawing on the opposite end (e.g., the filter end) of the cigarette.

The tobacco used for cigarette manufacture is typically used in blended form. For example, certain popular tobacco blends, commonly referred to as "American blends," comprise mixtures of flue-cured tobacco, burley tobacco and Oriental tobacco, and in many cases, certain processed tobaccos, such as reconstituted tobacco and processed tobacco stems. The precise amount of each type of tobacco within a tobacco blend used for the manufacture of a particular cigarette brand varies from brand to brand. However, for many tobacco blends, flue-cured tobacco makes up a relatively large proportion of the blend, while Oriental tobacco makes up a relatively small proportion of the blend. See, for example, *Tobacco Encyclopedia*, Voges (Ed.) p. 44-45 (1984), Browne, *The Design of Cigarettes*, 3$^{rd}$ Ed., p. 43 (1990) and *Tobacco Production, Chemistry and Technology*, Davis et al. (Eds.) p. 346 (1999).

Tobacco also may be enjoyed in a so-called "smokeless" form. Particularly popular smokeless tobacco products are employed by inserting some form of processed tobacco or tobacco-containing formulation into the mouth of the user. See for example, the types of smokeless tobacco formulations, ingredients, and processing methodologies set forth in U.S. Pat. No. 1,376,586 to Schwartz; U.S. Pat. No. 3,696,917 to Levi; U.S. Pat. No. 4,513,756 to Pittman et al.; U.S. Pat. No. 4,528,993 to Sensabaugh, Jr. et al.; U.S. Pat. No. 4,624,269 to Story et al.; U.S. Pat. No. 4,991,599 to Tibbetts; U.S. Pat. No. 4,987,907 to Townsend; U.S. Pat. No. 5,092,352 to Sprinkle, III et al.; U.S. Pat. No. 5,387,416 to White et al.; U.S. Pat. No. 6,668,839 to Williams; U.S. Pat. No. 6,834,654 to Williams; U.S. Pat. No. 6,953,040 to Atchley et al.; U.S. Pat. No. 7,032,601 to Atchley et al.; and U.S. Pat. No. 7,694,686 to Atchley et al.; US Pat. Pub. Nos. 2004/0020503 to Williams; Pat. Pub. No. 2005/0115580 to Quinter et al.; Pat. Pub. No. 2005/0244521 to Strickland et al.; Pat. Pub. No. 2006/0191548 to Strickland et al.; Pat. Pub. No. 2007/0062549 to Holton, Jr. et al.; Pat. Pub. No. 2007/0186941 to Holton, Jr. et al.; Pat. Pub. No. 2007/0186942 to Strickland et al.; Pat. Pub. No. 2008/0029110 to Dube et al.; Pat. Pub. No. 2008/0029116 to Robinson et al.; Pat. Pub. No. 2008/0029117 to Mua et al.; Pat. Pub. No. 2008/0173317 to Robinson et al.; Pat. Pub. No. 2008/0196730 to Engstrom et al.; Pat. Pub. No. 2008/0209586 to Neilsen et al.; Pat. Pub. No. 2008/0305216 to Crawford et al.; Pat. Pub. No. 2009/0025738 to Mua et al.; Pat. Pub. No. 2009/0025739 to Brinkley et al.; Pat. Pub. No. 2009/0065013 to Essen et al.; Pat. Pub. No. 2009/0293889 to Kumar et al.; Pat. Pub. No. 2010/0018540 to Doolittle et al; Pat. Pub. No. 2010/0018541 to Gerardi et al.; Pat. Pub. No. 2010/0291245 to Gao et al; Pat. Pub. No. 2011/0139164 to Mua et al.; Pat. Pub. No. 2011/0174323 to Coleman, III et al.; Pat. Pub. No. 2011/0247640 to Beeson et al.; Pat. Pub. No. 2011/0259353 to Coleman, III et al.; Pat. Pub. No. 2012/0037175 to Cantrell et al.; Pat. Pub. No. 2012/0055494 to Hunt et al.; Pat. Pub. No. 2012/0103353 to Sebastian et al.; Pat. Pub. No. 2012/0125354 to Byrd et al.; Pat. Pub. No. 2012/0138073 to Cantrell et al.; and Pat. Pub. No. 2012/0138074 to Cantrell et al; PCT WO 04/095959 to Arnarp et al.; PCT WO 05/063060 to Atchley et al.; PCT WO 05/004480 to Engstrom; PCT WO 05/016036 to Bjorkholm; PCT WO 05/041699 to Quinter et al., and PCT WO 10/132444 to Atchley; each of which is incorporated herein by reference.

One type of smokeless tobacco product is referred to as "snuff." Representative types of moist snuff products, commonly referred to as "snus," have been manufactured in Europe, particularly in Sweden, by or through companies such as Swedish Match AB, Fiedler & Lundgren AB, Gustavus AB, Skandinavisk Tobakskompagni A/S, and Rocker Production AB. Snus products available in the U.S.A. have been marketed under the tradenames Camel Snus Frost, Camel Snus Original and Camel Snus Spice by R. J. Reynolds Tobacco Company. See also, for example, Bryzgalov et al., 1N1800 Life Cycle Assessment, Comparative Life Cycle Assessment of General Loose and Portion Snus (2005). In addition, certain quality standards associated with snus manufacture have been assembled as a so-called GothiaTek standard. Representative smokeless tobacco products also have been marketed under the tradenames Oliver Twist by House of Oliver Twist A/S; Copenhagen moist tobacco, Copenhagen pouches, Skoal Bandits, Skoal Pouches, SkoalDry, Rooster, Red Seal long cut, Husky, and Revel Mint Tobacco Packs by U.S. Smokeless Tobacco Co.; Marlboro Snus and "taboka" by Philip Morris USA; Levi Garrett, Peachy, Taylor's Pride, Kodiak, Hawken Wintergreen, Grizzly, Dental, Kentucky King, and Mammoth Cave by American Snuff Company, LLC; Camel Snus, Camel Orbs, Camel Sticks, and Camel Strips by R. J. Reynolds Tobacco Company. Other exemplary smokeless tobacco products that have been marketed include those referred to as Kayak moist snuff and Chatanooga Chew chewing tobacco by Swisher International, Inc.; and Redman chewing tobacco by Pinkerton Tobacco Co. LP.

It would be desirable to provide additional uses for the portions of the tobacco plant commonly viewed as waste. In particular, it would be advantageous to develop products derived from tobacco biomass, specifically from the stalk or roots of a plant of the *Nicotiana* species.

SUMMARY OF THE INVENTION

The present invention provides methods of forming cellulosic sugars from the stalk or roots of a plant of the *Nicotiana* species, comprising i) receiving a tobacco material comprising at least one of a stalk material and a root material of a harvested plant of the *Nicotiana* species; ii) delignifying the tobacco material to form a tobacco-derived pulp; and iii) hydrolyzing the tobacco-derived pulp to form a hydrolyzed tobacco product comprising residual solids and a liquid comprising at least one tobacco-derived cellulosic sugar. In various embodiments, the tobacco material can comprise at least about 90 percent by dry weight of at least one of the stalk material and the root material of the harvested plant of the *Nicotiana* species.

In various embodiments, the step of delignifying the tobacco material can comprise grinding at least one of the stalk material and the root material of a harvested plant of the *Nicotiana* species to form the tobacco-derived pulp. The step of delignifying the tobacco material can further comprise rinsing and dewatering the tobacco-derived pulp, for example. In certain embodiments, the step of delignifying the tobacco material can further comprise adjusting the pH of the tobacco-derived pulp to a value in the range of about 4.5 to about 5.5. The methods of the present invention can further comprise drying the tobacco-derived pulp to at least 10% moisture content or less.

In various embodiments, the step of hydrolyzing the tobacco-derived pulp can comprise enzymatic saccharification of the tobacco-derived pulp in the presence of at least one enzyme. In certain embodiments, the method can include a two-step saccharification process which includes adding at least one enzyme to the tobacco-derived pulp undergoing the enzymatic hydrolysis to reduce the amount of xylose in the hydrolyzed tobacco product.

In various embodiments, the method can further comprise evaporating the liquid comprising at least one tobacco-derived cellulosic sugar to form a condensed syrup. The condensed syrup can comprise at least about 80% by weight glucose, for example. In some embodiments, the condensed syrup can comprise about 15% by weight xylose or less, for example.

In various embodiments, the method can further comprise converting glucose derived from raw tobacco materials to sorbitol by hydrogenation using a nickel catalyst. In some embodiments, the method can further comprise converting glucose derived from raw tobacco materials to levulinic acid by hydrolysis.

In various embodiments, the method can further comprise adding a yeast to the hydrolyzed tobacco product and allowing the hydrolyzed tobacco product and yeast to ferment and form a fermented pulp slurry comprising glycerol. The glycerol can be produced at an average yield of at least about 10% by weight of the total weight of delignified tobacco-derived pulp, for example.

In some embodiments, the method can further comprise separating the residual solids and the liquid; adding a yeast to the liquid; and allowing the liquid and the yeast to ferment and form a fermented product comprising ethanol. In certain embodiments, the method can further comprise separating the residual solids and the liquid; adding a high-protein medium to the liquid; and allowing the liquid and the high-protein medium to ferment and form a fermented product comprising lactic acid.

In various embodiments, the method can further comprise incorporating the tobacco-derived cellulosic sugars into a tobacco product. The tobacco product can be a smoking article, for example.

The present invention also provides a cellulosic sugar derived from hydrolyzed tobacco material comprising at least one of a tobacco stalk material and a tobacco root material of a harvested plant of the *Nicotiana* species. Before hydrolysis, the tobacco material can comprise at least about 90 percent by dry weight of at least one of the stalk material and the root material of the harvested plant of the *Nicotiana* species.

In several embodiments, tobacco products incorporating the cellulosic sugars derived from hydrolyzed tobacco material or downstream products derived from the cellulosic sugar can be provided. The downstream products of the cellulosic sugar can be selected from the group consisting of high fructose tobacco syrup, glycerol, levulinic acid, lactic acid, and combinations thereof.

BRIEF DESCRIPTION OF THE DRAWINGS

In order to provide an understanding of embodiments of the invention, reference is made to the appended drawings, which are not necessarily drawn to scale, and in which reference numerals refer to components of exemplary embodiments of the invention. The drawings are exemplary only, and should not be construed as limiting the invention.

DETAILED DESCRIPTION

The present invention now will be described more fully hereinafter. This invention may, however, be embodied in many different forms and should not be construed as limited to the embodiments set forth herein; rather, these embodiments are provided so that this disclosure will be thorough and complete, and will fully convey the scope of the invention to those skilled in the art. As used in this specification and the claims, the singular forms "a," "an," and "the" include plural referents unless the context clearly dictates otherwise. Reference to "dry weight percent" or "dry weight basis" refers to weight on the basis of dry ingredients (i.e., all ingredients except water).

The present invention provides methods of forming cellulosic sugars from the stalk or roots of a plant of the *Nicotiana* species, comprising i) receiving a tobacco material comprising at least one of a stalk material and a root material of a harvested plant of the *Nicotiana* species; ii) delignifying the tobacco material to form a tobacco-derived pulp; and iii) hydrolyzing the tobacco-derived pulp to form a hydrolyzed tobacco product comprising residual solids and a liquid comprising at least one tobacco-derived cellulosic sugar. In several embodiments, the method can further comprise converting the tobacco-derived cellulosic sugar to downstream products, as discussed in more detail below. The present invention also provides a cellulosic sugar derived from hydrolyzed tobacco material comprising at least one of a tobacco stalk material and a tobacco root material of a harvested plant of the *Nicotiana* species.

Figure 1:
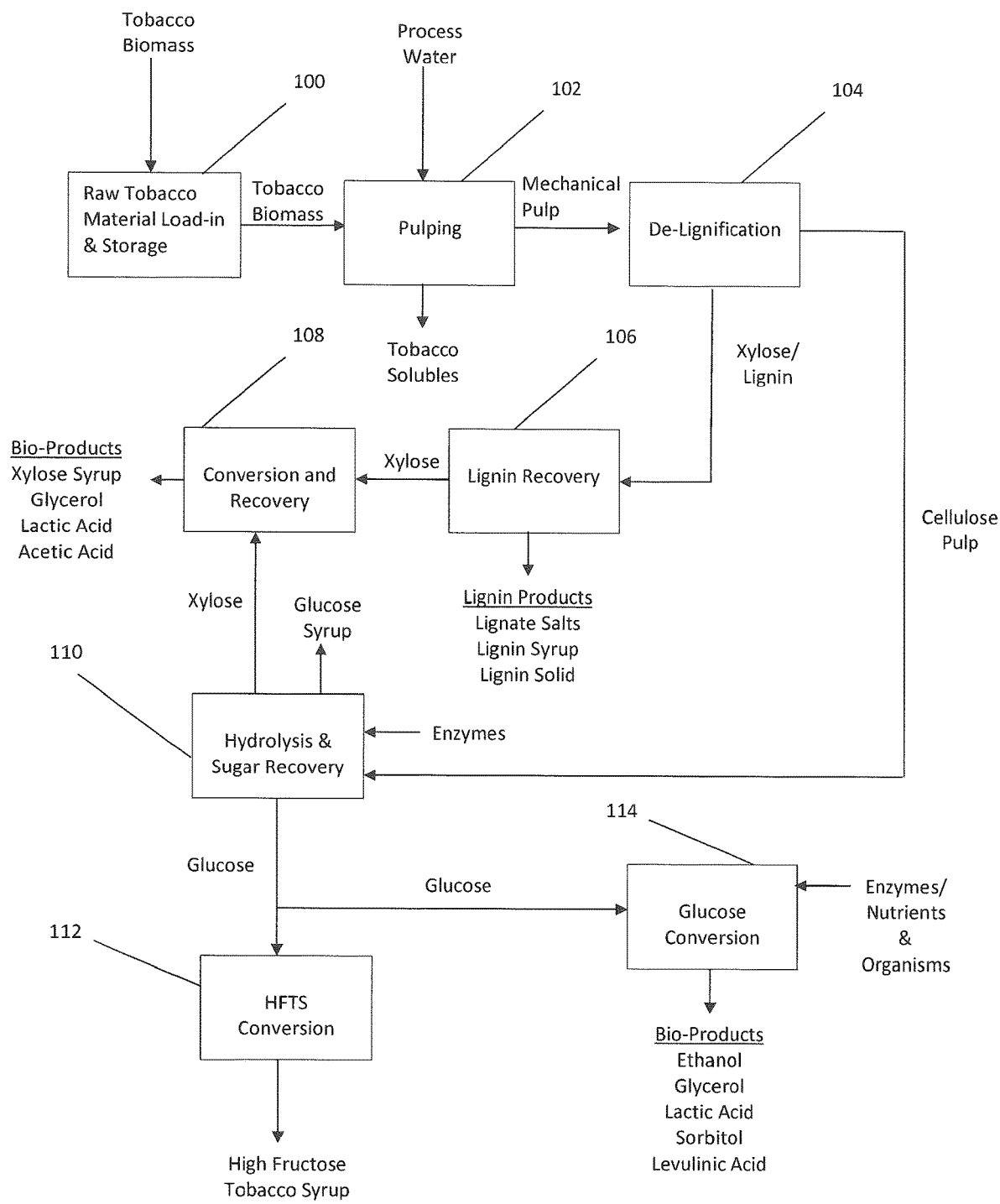
FIG. 1 is a flow chart describing methods of forming cellulosic sugars and optional downstream products from tobacco biomass materials.

As illustrated in FIG. 1, and discussed in more detail below, tobacco biomass (loaded at operation 100) can undergo a pulping process at operation 102 and in certain embodiments, a de-lignification process at operation 104. The de-lignified product can comprise lignin, xylose and cellulose pulp, for example. The lignin and xylose can be separated from the pulp and the lignin can be recovered at operation 106, for example. Optionally, the xylose can undergo a conversion and recovery process to produce xylose syrup, glycerol, lactic acid, acetic acid, and combinations thereof at operation 108, for example. In addition, the cellulose pulp can undergo hydrolysis and sugar recovery processes to produce various products including xylose, glucose and glucose syrup at operation 110, for example. The glucose can further undergo a conversion process at operation 112 to produce high fructose tobacco syrup. The glucose can also undergo various conversion processes at operation 114 to produce bio-products including glycerol, lactic acid, sorbitol, levulinic acid, ethanol and combinations thereof, as discussed in more detail below.

Tobacco Materials

As illustrated at operation 100 of FIG. 1, for example, preparation of a tobacco material according to the present invention can comprise harvesting a plant from the *Nicotiana* species and, in certain embodiments, separating certain components from the plant such as the stalks and/or roots, and physically processing these components. Although whole tobacco plants or any component thereof (e.g., leaves, flowers, stems, roots, stalks, and the like) could be used in the invention, it is advantageous to use stalks and/or roots of the tobacco plant. The remainder of the description focuses on use of stalks and/or roots from the plant, but the invention is not limited to such embodiments.

The tobacco stalks and/or roots can be separated into individual pieces (e.g., roots separated from stalks, and/or root parts separated from each other, such as big root, mid root, and small root parts) or the stalks and roots may be combined. By "stalk" is meant the stalk that is left after the leaf (including stem and lamina) has been removed. "Root" and various specific root parts useful according to the present invention may be defined and classified as described, for example, in Mauseth, Botany: An Introduction to Plant Biology: Fourth Edition, Jones and Bartlett Publishers (2009) and Glimn-Lacy et al., Botany Illustrated, Second Edition, Springer (2006), which are incorporated herein by reference. The harvested stalks and/or roots are typically cleaned, ground, and dried to produce a material that can be described as particulate (i.e., shredded, pulverized, ground, granulated, or powdered). As used herein, stalks and/or roots can also refer to stalks and/or roots that have undergone an extraction process to remove water soluble materials. The cellulosic material (i.e., pulp) remaining after stalks and/or root materials undergo an extraction process can also be useful in the present invention.

The roots and stalks of a tobacco plant have a higher weight percentage of cellulosic content than tobacco stems. As a result, the roots and stalks of a tobacco plant have a higher sugar yield potential than tobacco stems. Additionally, tobacco stems represent a valuable starting material for the preparation of tobacco reconstituted sheet and expanded stem materials used in tobacco products. Use of tobacco stems as a source for cellulosic sugars would decrease the supply of tobacco stems that can be used in other tobacco manufacturing processes. Tobacco stalks and roots represent a tobacco material not otherwise used in tobacco manufacturing and as such, represent an excellent raw material for the preparation of tobacco-derived cellulosic sugar. An additional tobacco raw material that is otherwise not used in tobacco manufacturing is so-called tobacco dust (i.e., a very small particle tobacco material collected during cigarette manufacturing) and so-called stemmery dust (i.e., a tobacco-derived material collected during the stemming of the tobacco leaves). Tobacco dust and stemmery dust can also be used to produce a cellulosic sugar.

Although the tobacco material may comprise material from any part of a plant of the *Nicotiana* species, the majority of the material typically comprises material obtained from the stalks and/or roots of the plant. For example, in certain embodiments, the tobacco material comprises at least about 90%, at least about 92%, at least about 95%, or at least about 97% by dry weight of at least one of the stalk material and the root material of a harvested plant of the *Nicotiana* species.

The manner by which the stalks and/or roots are provided in such a form can vary. For example, material obtained from *Nicotiana* plant stalks can be isolated and treated separately from material obtained from *Nicotiana* plant roots. In addition, material from various parts of the stalks and/or roots can be isolated and treated separately (for example, material derived from different parts of the root can be kept separate throughout the processing). In some embodiments, material from different parts of the *Nicotiana* plant can be combined and processed together, thereby forming a single homogenous tobacco material. In some embodiments, material from different parts of the *Nicotiana* plant are isolated and treated separately and combined at some stage of the processing to give a single tobacco product.

Preferably, the physical processing step comprises comminuting, grinding, and/or pulverizing stalks and/or roots from a *Nicotiana* plant into particulate form using equipment and techniques for grinding, milling, or the like. In certain preferred embodiments, the stalks and/or roots are dried prior to the physical processing step, and thus are relatively dry in form during grinding or milling. For example, the stalks and/or roots can be ground or milled when the moisture content thereof is less than about 15 weight percent or less than about 5 weight percent. In such embodiments, equipment such as hammer mills, cutter heads, air control mills, or the like may be used.

The tobacco material provided following the comminuting, grinding, and/or pulverizing of *Nicotiana* stalks and/or roots can have any size. The tobacco material can be such that parts or pieces thereof have an average width and/or length between about $1/16$ inch to about 2 inches, about $1/4$ inch to about 1 inch, or about $1/4$ inch to about $1/2$ inch. In some embodiments, the average width and/or length of the tobacco material is greater than or equal to about $1/8$ inches, greater than or equal to about $1/4$ inch, greater than or equal to about $1/2$ inch, greater than or equal to about 1 inch, or greater than or equal to about 2 inches.

In certain embodiments, the tobacco material can be treated with water to extract an aqueous soluble component of the tobacco material therefrom. In some preferred embodiments, the particulate or powder tobacco material can be combined with water to form a moist aqueous material (e.g., in the form of a suspension or slurry) and the resulting material is typically heated to effectuate extraction of various compounds. The water used to form the moist material can be pure water (e.g., tap water or deionized water) or a mixture of water with suitable co-solvents such as certain alcohols. In certain embodiments, the amount of water added to form the moist material can be at least about 50 weight percent, or at least about 60 weight percent, or at least about 70 weight percent, based on the total weight of the moist material. In some cases, the amount of water can be described as at least about 80 weight percent or at least about 90 weight percent.

The extract thus produced may comprise some level of solid (insoluble) material entrained in the liquid. Accordingly, "extract" is intended to mean the material obtained upon contacting the stalks and/or roots with water and may comprise both soluble components dissolved therein and solid dispersed components. Following the extraction process, the extracted liquid component is typically filtered to remove at least some of the solids. In other words, some or all of the portion of the tobacco material insoluble in the aqueous solvent is removed. The process of filtration can comprise passing the liquid through one or more filter screens to remove selected sizes of particulate matter. Screens may be, for example, stationary, vibrating, rotary, or any combination thereof. Filters may be, for example, press filters or pressure filters. In some embodiments, the filtration method used can involve microfiltration, ultrafiltration, and/or nanofiltration. A filter aid can be employed to provide effective filtration and can comprise any material typically used for this purpose. For example, some common filter aids include cellulose fibers, perlite, bentonite, diatomaceous earth, and other silaceous materials. To remove solid components, alternative methods can also be used, for example, centrifugation or settling/sedimentation of the components and siphoning off of the liquid. See, for example, the processes and products described in U.S. Pat. App. Pub. No. 2012/0152265 to Dube et al. and Pat. App. Pub. No. 2012/0192880 to Dube et al., herein incorporated by reference in their entireties. The extracted solid components can be used as the starting tobacco material in various embodiments of the invention described herein.

The exact composition of the tobacco material produced according to the present invention can vary. The composition may depend, in part, on whether the tobacco material is prepared from *Nicotiana* stalks, roots, or a combination thereof. Tobacco material prepared solely from material obtained from *Nicotiana* stalks may exhibit different characteristics than tobacco material prepared solely from material obtained from *Nicotiana* roots. Similarly, tobacco material prepared from material obtained from certain parts of one of these components may exhibit different characteristics than material obtained from other parts of this component (e.g., tobacco material prepared from mid-root material may be different from tobacco material prepared from big root material). For example, in certain embodiments, tobacco material derived from *Nicotiana* stalk has a higher content of volatile compounds than tobacco material derived from *Nicotiana* root.

The selection of the plant from the *Nicotiana* species utilized in the process of the invention can vary; and in particular, the types of tobacco or tobaccos can vary. The type of tobacco used as the source of tobacco stalks and/or roots from which the tobacco material is derived can vary. Tobaccos that can be employed include flue-cured or Virginia (e.g., K326), burley, sun-cured (e.g., Indian Kurnool and Oriental tobaccos, including Katerini, Prelip, Komotini, Xanthi and Yambol tobaccos), Maryland, dark, dark-fired, dark air cured (e.g., Passanda, Cubano, Jatin and Bezuki tobaccos), light air cured (e.g., North Wisconsin and Galpao tobaccos), Indian air cured, Red Russian and Rustica tobaccos, as well as various other rare or specialty tobaccos. Descriptions of various types of tobaccos, growing practices and harvesting practices are set forth in *Tobacco Production, Chemistry and Technology*, Davis et al. (Eds.) (1999), which is incorporated herein by reference. Various representative types of plants from the *Nicotiana* species are set forth in Goodspeed, *The Genus Nicotiana*, (Chonica Botanica) (1954); U.S. Pat. No. 4,660,577 to Sensabaugh, Jr. et al.; U.S. Pat. No. 5,387,416 to White et al. and U.S. Pat. No. 7,025,066 to Lawson et al.; US Patent Appl. Pub. Nos. 2006/0037623 to Lawrence, Jr. and App. Pub. No. 2008/0245377 to Marshall et al.; each of which is incorporated herein by reference.

The particular *Nicotiana* species of material used in the invention could also vary. Of particular interest are *N. alata, N. arentsii, N. excelsior, N. forgetiana, N. glauca, N. glutinosa, N. gossei, N. kawakamii, N. knightiana, N. langsdorffi, N. otophora, N. setchelli, N. sylvestris, N. tomentosa, N. tomentosiformis, N. undulata,* and *N.×sanderae*. Also of interest are *N. africana, N. amplexicaulis, N. benavidesii, N. bonariensis, N. debneyi, N. longiflora, N. maritina, N. megalosiphon, N. occidentalis, N. paniculata, N. plumbaginifolia, N. raimondii, N. rosulata, N. rustica, N. simulans, N. stocktonii, N. suaveolens, N. tabacum, N. umbratica, N. velutina,* and *N. wigandioides*. Other plants from the *Nicotiana* species include *N. acaulis, N. acuminata, N. attenuata, N. benthamiana, N. cavicola, N. clevelandii, N. cordifolia, N. corymbosa, N. fragrans, N. goodspeedii, N. linearis, N. miersii, N. nudicaulis, N. obtusifolia, N. occidentalis* subsp. *Hersperis, N. pauciflora, N. petunioides, N. quadrivalvis, N. repanda, N. rotundifolia, N. solanifolia* and *N. spegazzinii*. The *Nicotiana* species can be derived using genetic-modification or crossbreeding techniques (e.g., tobacco plants can be genetically engineered or crossbred to increase or decrease production of certain components or to otherwise change certain characteristics or attributes). See, for example, the types of genetic modifications of plants set forth in U.S. Pat. No. 5,539,093 to Fitzmaurice et al.; U.S. Pat. No. 5,668,295 to Wahab et al.; U.S. Pat. No. 5,705,624 to Fitzmaurice et al.; U.S. Pat. No. 5,844,119 to Weigl; U.S. Pat. No. 6,730,832 to Dominguez et al.; U.S. Pat. No. 7,173,170 to Liu et al.; U.S. Pat. No. 7,208,659 to Colliver et al.; and U.S. Pat. No. 7,230,160 to Benning et al.; US Patent Appl. Pub. No. 2006/0236434 to Conkling et al.; and PCT WO 2008/103935 to Nielsen et al.

The plant component or components from the *Nicotiana* species can be employed in an immature form. That is, the plant can be harvested before the plant reaches a stage normally regarded as ripe or mature. As such, for example, the plant can be harvested when the tobacco plant is at the point of a sprout, is commencing leaf formation, is commencing flowering, or the like.

The plant components from the *Nicotiana* species can be employed in a mature form. That is, the plant can be harvested when that plant reaches a point that is traditionally viewed as being ripe, over-ripe or mature. As such, for example, through the use of tobacco harvesting techniques conventionally employed by farmers, Oriental tobacco plants can be harvested, burley tobacco plants can be harvested, or Virginia tobacco leaves can be harvested or primed by stalk position.

After harvest, the plant of the *Nicotiana* species, or portion thereof, can be used in a green form (e.g., tobacco can be used without being subjected to any curing process). For example, tobacco in green form can be frozen, freezedried, subjected to irradiation, yellowed, dried, cooked (e.g., roasted, fried or boiled), or otherwise subjected to storage or treatment for later use. Such tobacco also can be subjected to aging conditions.

Converting Tobacco Material into Cellulose Materials

In various embodiments of the present invention, the tobacco material can be converted into a cellulose material through delignification of the tobacco material, for example. Delignification of tobacco materials can involve a number of operations. As an initial step, tobacco biomass can undergo a pulping process. Pulps can be produced from raw materials either mechanically or chemically, as illustrated at operation 102 in FIG. 1, for example.

For example, refiner mechanical pulping techniques can be used to produce tobacco stalk and/or root pulp. In a mechanical pulping process, raw tobacco materials can be chipped, and then fed between refiners where the chips are made into fibers between revolving metal disks, for example. See, e.g., the mechanical pulping equipment and processes disclosed in U.S. Pat. No. 4,421,595 to Huusari and U.S. Pat. No. 7,237,733 to Vikman, WO 2010/023363, CA 1074606, and CN 201268810, all of which are herein incorporated by reference in their entireties. In some embodiments, raw tobacco stalk and/or root can be pre-treated with water for several hours. The weight ratio of water to stalk can be approximately 10:1 to about 5:1 (e.g., about 7:1). Pretreating the tobacco stalk can soften the stalk and remove water soluble extracts. The pretreated mixture can then be drained to about a 20% consistency. As used herein, the term "consistency" is defined as the percentage of solids in a mixture. This pretreated stalk can then be refined at atmospheric pressure with a plurality of passes through a machine that can chip the stalk. See, for example, the machines discussed in U.S. Pat. No. 3,661,192 to Nicholson et al.; U.S. Pat. No. 3,861,602 to Smith et al.; U.S. Pat. No. 4,135,563 to Maucher; and U.S. Pat. No. 5,005,620 to Morey, each of which is incorporated by reference herein. In various embodiments, the machines can be calibrated such that the targeted size of the stalk chips can decrease which each successive pass. These chipped pulps can then be refined in a PFI mill to various levels, for example. See, for example, the methods and apparatuses discussed in U.S. Pat. No. 6,773,552 to Albert et al.; and U.S. Appl. Pub. No. 2010/0036113 to Mambrim Filho et al, herein incorporated by reference.

As illustrated at operation 104 of FIG. 1, for example, the tobacco-derived pulp can undergo a de-lignification process. Mechanical pulping does not separate the lignin from cellulose fibers, so the yield is often relatively high (i.e., above 95%). Several processes can be used to delignify the mechanically pulped tobacco material. For example, the pulp can be rinsed with water and dewatered at least once. The pulp can be dewatered by wet classification, centrifugation, filtration, or similar liquid separation processes. A centrifuge or other similar equipment can help with pulp and syrup (i.e., solids and liquid) separations. See, e.g., the equipment disclosed in U.S. Pat. No. 521,104 to Davis, U.S. Pat. No. 3,168,474 to Stallman et al., U.S. Pat. No. 5,713,826 to West, and U.S. Pat. No. 7,060,017 to Collier, each of which is herein incorporated by reference in its entirety. For example, a basket centrifuge can be useful to help with the pulp dewatering and lignin syrup recovery activities. In addition, the pulp can then be rinsed one or more times and the pH can be adjusted to a range of about 4.5 to about 5.5. In a preferred embodiment, the pH can be adjusted to about 4.8. The pulp can be dewatered after each rinse.

In some embodiments, a chemical pulping process can be used to pulp and delignify the tobacco biomass. A chemical pulping process separates lignin from cellulose fibers by dissolving lignin in a cooking liquor such that the lignin, which binds the cellulose fibers together, can be washed away from the cellulose fibers without seriously degrading the cellulose fibers. There are three main chemical pulping processes known in the art. Soda pulping involves cooking raw material chips in a sodium hydroxide cooking liquor. The kraft process evolved from soda pulping and involves cooking raw material chips in a solution of sodium hydroxide and sodium sulfide. The acidic sulfite process involves using sulfurous acid and bisulfate ion in the cook. The kraft process is the most commonly used method for chemical wood pulping; however, the soda process can also be used to produce some hardwood pulps. Any chemical pulping process, including, but not limited to the three examples listed above, can be used to produce a tobacco pulp from raw tobacco materials.

A cooking liquor can comprise a strong base. As used herein, a strong base refers to a basic chemical compound (or combination of such compounds) that is able to deprotonate very weak acids in an acid-base reaction. For example, strong bases that can be useful in the present invention include, but are not limited to one or more of sodium hydroxide, potassium hydroxide, sodium carbonate, sodium bicarbonate, potassium carbonate, potassium bicarbonate, ammonium hydroxide, ammonium bicarbonate, and ammonium carbonate. In some embodiments, the weight of the strong base can be greater than about 5%, greater than about 25%, or greater than about 40% of the weight of the tobacco input. In certain embodiments, the weight of the strong base can be less than about 60% or less than about 50% of the weight of the tobacco input. In still further embodiments, the weight of the strong base can be from about 5% to about 50%, or from about 30% to about 40% of the weight of the tobacco input. Various other chemicals and weight ratios thereof can also be employed to chemically pulp the tobacco input in other embodiments.

In addition to combining a tobacco input with a strong base, chemically pulping a tobacco input can include heating the tobacco input and the strong base. Heating the tobacco input and the strong base can be conducted to increase the efficacy of the chemical pulping. In this regard, an increase in either cooking temperature or time will result in an increased reaction rate (rate of lignin removal).

In various embodiments, an Organosolv process can be used to delignify the tobacco biomass. Organosolv (solvent-based) pulping is a chemical pulping method in which delignification of biomass is done by an organic solvent or solvent plus water system. See, for example, the Organosolv process described in Ziaie-Shirkolaee et al., *Study on Cellulose Degradation during Organosolv Delignification of Wheat Straw and Evaluation of Pulp Properties*, Iranian Polymer Journal 16(2), 2007, pp 83-96, herein incorporated by reference. Organosolv uses acid digestion of the pulp in the presence of a solvent (e.g., ethanol or butanol) to solubilize the lignin and remove it from the pulp. See, e.g., U.S. Pat. App. Pub. No. 2013/0172628, herein incorporated by reference.

In some embodiments, the method of producing a tobacco-derived cellulose material can include one or more additional operations. See, e.g., U.S. Patent Appl. Pub. No. 2013/0276801 to Byrd Jr. et al., herein incorporated by reference in its entirety. For example, the tobacco input can undergo further processing steps prior to pulping and/or the delignification method can include additional treatment steps (e.g., drying the tobacco input, depithing the tobacco input, milling the tobacco input, etc.). In some embodiments, these additional steps can be conducted to remove pith (which comprises lignin) from the tobacco input and/or tobacco pulp manually, and thus reduce the amount of chemicals necessary to delignify the tobacco input during a chemical pulping process, for example. Mixing water with the tobacco pulp to form a slurry and filtering the slurry can be conducted, for example, to remove some of the non-cellulosic materials, such as pith, parenchyma, and tissue from the tobacco pulp. Additional treatment steps (e.g., milling the tobacco input) can be conducted to increase the surface area of the tobacco input such that the efficacy of a pulping and/or a bleaching operation is increased. Steam- or water-based pre-hydrolysis of the tobacco stalk prior to pulping, for example, can reduce the amount of chemicals necessary in a bleaching operation. Anthraquinone can be employed in a chemical pulping method in an attempt to provide a higher yield by protecting carbohydrates from the strong base during delignification, for example. Other processing steps known in the pulping and delignification field can be employed in forming cellulosic materials from the raw tobacco input.

In some embodiments, the aqueous mixture lignin and xylose can be separated from the pulp via separation processes known in the art, and the lignin can be recovered at operation 106. For example, the water can be cooked out of the liquid to make a more concentrated lignin syrup. In certain embodiments, an acid or a base can be added to the lignin syrup to form a lignin salt. In some embodiments, a Group I or Group II metal (e.g., magnesium, calcium, potassium, etc.) can be added to the lignin syrup to form a solid (e.g., calcium hydroxide) via precipitation.

In some embodiments, the xylose separated from the pulp can undergo an optional conversion and recovery process to produce xylose syrup, glycerol, lactic acid, acetic acid, and combinations thereof at operation 108, for example. The conversion and recovery processes can be similar to those described below with regard to glucose conversion and recovery processes, however, the yield of the bio-products derived from xylose can be relatively low. Instead, in various embodiments, the conversion and recovery of xylose can result primarily in the formation of acetic acid.

Formation of Tobacco-Derived Cellulosic Sugar

After delignifying tobacco biomass, the cellulose material can undergo at least one saccharification process, as illustrated at operation 110 of FIG. 1, for example. Any form of hydrolysis known in the art can be used to break carbohydrates in the tobacco-derived cellulose material into component sugar molecules. In certain embodiments, a salt of a weak acid or a weak base (or both) can be dissolved in water in a hydrolysis process. Acid-base-catalysed hydrolyses can also be used, for example. In various embodiments, cellulosic materials can undergo enzymatic hydrolysis to form glucose. See, for example, the discussion of enzymatic hydrolysis of cellulose presented in Zhang, Yi-Heng Percival et al., Toward an Aggregated Understanding of Enzymatic Hydrolysis of Cellulose: Noncomplexed Cellulase Systems. Wiley InterScience. Biotechnology and Bioengineering, Vol. 88, No. 7, Dec. 30, 2004, p. 797-824. Generally, cellulose enzyme systems can hydrolyze cellulosic materials. The insoluble cellulosic material can undergo three processes simultaneously: (i) chemical and physical changes in the residual solid-phase cellulose; (ii) primary hydrolysis of the solid phase cellulose to form intermediate products comprising cellobiose, soluble cellodextrins and glucose; and (iii) secondary hydrolysis involving the hydrolysis of soluble intermediates to lower molecular weight intermediates, and ultimately to a liquid phase product comprising glucose. Accordingly, hydrolyzing the tobacco-derived cellulose material can result in a hydrolyzed tobacco product (i.e., a liquid mash) comprising residual solids and a liquid comprising at least one tobacco-derived cellulosic sugar. In various embodiments, the at least one tobacco-derived cellulosic sugar can include glucose, xylose, and combinations thereof.

In various embodiments, the enzyme used for saccharification can comprise Cellic® CTec 2 (produced by Novozymes A/S). Cellic® CTec 2 is an effective cellulase/hemicellulose enzyme that produces sugars from biomass. In some embodiments, the enzyme used for saccharification can comprise enzymes produced by DSM Food Specialties B.V. (The Netherlands), such as those directed towards food processing. Any cellulase/hemicellulose enzymes known in the art can be used in enzymatic saccharification processes described herein. The preferred enzyme concentration and time period for the enzymatic hydrolysis is generally recommended by the manufacturer. In various embodiments, the enzyme concentration can range from about 1 to about 10 percent by weight, or about 2 to about 5 percent by weight. In a preferred embodiment, the enzyme concentration can be about 3 percent by weight of the total materials undergoing enzymatic hydrolysis. In various embodiments, significant hydrolysis (i.e., about 50 to about 75 percent conversion of the starting cellulose materials) can be achieved in about 48 hours.

In various embodiments, the residual solids can be removed from the liquid mash through centrifugation, filtration or other means of liquid/solid separation. A centrifuge or other similar equipment can help with solids and liquid separations. See, e.g., the equipment disclosed in U.S. Pat. No. 521,104 to Davis, U.S. Pat. No. 3,168,474 to Stallman et al., U.S. Pat. No. 5,713,826 to West, and U.S. Pat. No. 7,060,017 to Collier, each of which is herein incorporated by reference in its entirety.

In certain embodiments, the separated liquid can be condensed to form a syrup. An evaporator, for example, can be used to condense the liquid product. In certain embodiments, a mechanical vapor recompression (MVR) evaporator can be useful to assist with condensing the syrup. See, e.g., the evaporators and processes disclosed in U.S. Pat. No. 4,303,468 to Laguilharre et al., U.S. Pat. No. 3,396,086 to Starmer, and U.S. Pat. No. 4,530,737 to Ostman; and U.S. Pat. App. Pub. No. 2014/0262730 to Zimmer, each of which is herein incorporated by reference. The concentrated syrup derived from a hydrolyzed tobacco product can comprise at least about 80% glucose by weight, at least about 85% glucose by weight, or at least about 90% glucose by weight. In certain embodiments, the concentrated syrup can comprise about 20% xylose by weight or less, about 15% xylose by weight or less, about 10% xylose by weight or less, or about 5% xylose by weight or less.

In various embodiments, an enzyme can be added to the saccharification process in order to reduce the amount of xylose in the liquid product. The enzyme can remove the hemicellulose before the final saccharification, for example. In various embodiments, the enzyme can be selected from the group consisting of Rhyzyme® (produced by American BioSystems, Inc.), Pulpzyme® HC & HC 2500 (produced by Novozymes A/S), Dyadic® Xylanase (produced by Dyadic Inc.), and combinations thereof. Rhyzyme® is an enzyme with high specificity to hemicellulose, with only small amounts of cellulase activity. Pulpzyme® HC & HC 2500 is an enzyme which is very specific to hemicellulose, and again has very little amounts of cellulase activity. Dyadic® Xylanase is an enzyme that has been shown to have high cellulase activity as well as high xylanase activity. The preferred enzyme concentration is generally recommended by the manufacturer.

Downstream Products

As discussed above, the present invention provides a cellulosic sugar derived from hydrolyzed tobacco material comprising at least one of a tobacco stalk material and a tobacco root material of a harvested plant of the *Nicotiana* species. Tobacco-derived cellulosic sugar materials generated according to the present invention can be useful to produce various products including, but not limited to, humectants, acids, flavorants, ethanol, and other glucose-derived products. See, e.g., the products listed in the process flow chart illustrated in FIG. 1. Various products produced from tobacco-derived glucose are discussed in more detail below.

High Fructose Tobacco Syrup

As described above, tobacco-derived cellulosic materials can undergo enzymatic hydrolysis to form glucose, for example. High fructose tobacco syrup can then be produced using commercial immobilized glucose isomerase (e.g., Sweetzyme® type IT produced by Novozymes). As illustrated at operation 112 of FIG. 1, for example, this isomerization can convert glucose, which is not very sweet, to fructose, the sweetest natural sugar. Syrups from this process can compete with sucrose (cane sugar) in many food applications. Almost all manufacturers of soft drinks, for example, use high fructose syrups because they are less expensive than sucrose. Tobacco products can also incorporate high fructose syrups for flavoring, for example.

Glucose isomerase (D-glucose ketoisomerase) causes the isomerization of glucose to fructose. The isomerization of glucose to fructose is part of the glycolysis cycle that converts glucose to pyruvate. The way this is done is to isomerize the aldehyde (hemiacetal) glucose to the ketone (as a hemiacetal) fructose, and make another phosphate ester. The isomerization takes advantage of the ease of breakage of a C—H bond which involves a carbon next to a carbonyl carbon. In the next step, the bond between carbons three and four of fructose is cleaved.

For example, Novo Industries has developed Sweetzyme®, glucose isomerase from *B. coagulans*, for commercial use. The commercial process for production of fructose from glucose became feasible when procedures for immobilization of the enzyme were developed, so that the same batch of enzymes could be used repeatedly. In this immobilized enzyme process, the microorganism carries out a direct isomerization of the glucose. This glucose isomerase is primarily a xylose isomerase, so xylose, or a xylose-containing compound must be added for the induction of the enzyme.

Glycerol

As illustrated at operation 114 of FIG. 1, for example, glycerol can be produced from tobacco-derived glucose. As illustrated at operation 108 of FIG. 1, for example, glycerol can also be produced from xylose recovered from delignifying tobacco pulp. Glycerol can be useful in various different industries and products. For example, in food and beverages, glycerol can serve as a humectant, solvent, sweetener, and combinations thereof. Glycerol can also be useful to help preserve foods, as a filler and/or as a thickening agent. Glycerol can also be useful in medical, pharmaceutical and personal care products (e.g., for providing lubrication and/or as a humectant). Various tobacco products can also incorporate glycerol in the form of a humectant, a sweetener, a solvent, and combinations thereof.

As described above, tobacco-derived cellulosic materials can undergo enzymatic hydrolysis to form glucose. The enzyme used for saccharification can comprise Cellic® CTec 3 (produced by Novozymes A/S), for example. Cellic® CTec 3 is an effective cellulase/hemicellulose enzyme that produces sugars from biomass. In various embodiments, yeast can be added to the saccharification process to produce a hydrolyzed tobacco product comprising glycerol. For example, fast-rising baker's yeast can be used. In various embodiments, about 10 g of yeast per liter of tobacco pulp slurry can be used, wherein the tobacco pulp slurry is about 5-10% solids (e.g., about 9% solids). Nutrients and hops (i.e., food for the yeast) can be used to supplement the process as well. The hydrolyzed tobacco product and yeast can be allowed to ferment and thereby form a fermented pulp slurry comprising glycerol. In various embodiments, glycerol can be produced at an average yield of at least about 10% by weight of the starting cellulosic materials. A weak base anion can be used on the solution to remove any lactic acid impurities.

In various embodiments, a pH adjuster or a buffering agent can be added to the saccharification process to control the pH in an optimal range, which can depend on the cellulose materials and yeast used. For example, the pH can be held in a range of about 5 to about 10 during the saccharification process. Exemplary agents include metal hydroxides, metal carbonates, metal bicarbonates, and mixtures thereof. Specific exemplary materials include sodium hydroxide, potassium hydroxide, potassium carbonate, sodium carbonate, and sodium bicarbonate. The amount of pH adjuster or buffering material utilized in the enzymatic hydrolysis can vary, but is typically up to about 5 dry weight percent, and certain embodiments can be characterized by a pH adjuster/buffer content of at least about 0.5 dry weight percent, such as about 1 to about 5 dry weight percent.

In some embodiments, a low dosage of bisulfate (e.g., about 2000 ppm or less) can be added periodically throughout the reaction in order to fix acetaldehyde and increase glycerol production by yeast. The bisulfite can be in the form of $Na_2S_2O_5$, for example. The pH can be held between 6.7 and 7.3 during the fermentation process using a pH controller and a base in order to stabilize the bisulfite concentration in a pH range tolerable to yeast.

Sorbitol

As described above, tobacco-derived cellulosic materials can undergo enzymatic hydrolysis to form glucose. In certain embodiments, the glucose can be condensed to form a syrup. The condensed glucose syrup can be converted to sorbitol by hydrogenation using a nickel catalyst, for example. Sorbitol can be useful as a sugar substitute. Sorbitol can also be used as a non-stimulant laxative. Sorbitol can also be useful in medical applications and in health care, food and cosmetic uses as a humectant and/or a thickener, for example. Sorbitol can also be useful as a humectant in tobacco products (e.g., smoking articles and/or smokeless tobacco products). In some aspects, sorbitol can be used to form transparent gels, as it has a refractive index sufficiently high for transparent formulations.

High yielding and efficient methods for the production of sorbitol from glucose are known. Sorbitol has been produced by batch hydrogenation using Raney® Nickel since 1942. See, Zhang, J, Ind. Eng. Chem. Res. 2013, 52, 11800, herein incorporated by reference. Refinements to the batch hydrogenation of glucose have primarily been modifications to the nickel sponge type catalysts such as the addition of molybdenum, chromium and iron. Commercial catalysts produced specifically for glucose to sorbitol production include, but are not limited to, BASF Actimet™ C, W.R. Grace 3111 and Johnson Matthey "Sponge Metal Catalyst 1." These catalysts typically have about 2 weight percent molybdenum. Raney® Nickel catalysts find favor in industrial settings due to their low cost. However, they are not entirely stable in the reaction environment.

During the hydrogenation process, nickel is imparted to the product and its removal imposes a cost particularly in high volume production situations or when a United States Pharmacopeia (USP) grade product is desired. As such, there has been a movement toward research into the use of ruthenium catalysts on various supports for the production of sorbitol. See, Zhang, J, Ind. Eng. Chem. Res. 2013, 52, 11802-11804, herein incorporated by reference. However, with improvements in the leaching behavior of some nickel catalysts and their low cost, it will likely be some time before nickel is displaced as the choice for glucose to sorbitol hydrogenation.

Continuous processes also are common for sorbitol production. A typical continuous process to produce sorbitol from glucose is the subject of U.S. Pat. No. 4,322,569 to Chou, herein incorporated by reference. A precursor is fed over a catalyst fixed bed at a controlled rate with hydrogen supplied at high pressure to hydrogenate the glucose to sorbitol in high yield.

It has also been discovered that glucose can be transformed to sorbitol without the use of gas hydrogen, as revealed in Zhang, J, Ind. Eng. Chem. Res. 2013, 52, 11805, herein incorporated by reference. Yields as high as 71.7% and selectivity of sorbitol production of 94.1% were achieved using Pd/C as a catalyst and sodium formate as a reducing agent. Formic acid is a byproduct of the production of levulinic acid from tobacco feedstock and sodium formate is simply the sodium salt of that byproduct.

Levulinic Acid

As described above, tobacco-derived cellulosic materials can undergo enzymatic hydrolysis to form glucose. See operation 114 of FIG. 1, for example. In certain embodiments, the glucose can be condensed to form a syrup. The condensed glucose syrup can be converted to levulinic acid by hydrolysis. Levulinic acid can function as a precursor to pharmaceuticals, plasticizers, and various other additives. Potential biofuels can be prepared from levulinic acid. Various tobacco products can incorporate levulinic acid. For example, electronic smoking articles can incorporate levulinic acid in an aerosol precursor composition.

The approaches taken for levulinic acid production from biomass can be roughly grouped into four categories: (1) concentrated acid/low temperature hydrolysis; (2) dilute acid/high temperature hydrolysis; (3) continuous processes; and (4) two step continuous processes.

The organic synthesis procedure of Mckenzie, described in Organic Syntheses, Coll. Vol. 1, p. 335 (1941), herein incorporated by reference, provides an example of concentrated acid/low temperature hydrolysis. This type of hydrolysis has a number of drawbacks such as extensive production of humins, arduous work-up, low yields and is environmentally unfriendly with its highly acidic waste stream.

The second generation of biomass hydrolysis to produce levulinic acid was the dilute acid/high temperature hydrolysis reactions. These are performed in pressure vessels due to their elevated temperature conditions. A table of 46 acid catalyzed batch production methods for levulinic acid can be viewed, for example, in Girsuta, B, Levulinic Acid from Lignocellulosic Biomass, Thesis, University of Groningen, 2007, herein incorporated by reference. Thirty four of these methods employed elevated temperatures (over 100° C.) and lowered acid concentration.

Continuous processes have been the choice for industrial production of levulinic acid for some time. Earlier continuous processes were high temperature hydrolyses conducted in a continuous stream though a tube furnace. More recent production schemes use reactive extruders to raise the temperature of the acidic slurry and cause the hydrolysis reaction to occur in a more controlled manner See, e.g., U.S. Pat. No. 5,859,263 to Ghorpade et al., herein incorporated by reference.

Deeper analysis of the chemical reactions that compose the processes of biomass hydrolysis and levulinic acid production reveals that it can be advantageous to separate the carbohydrate hydrolysis step from the production of levulinic acid. Biomass exposed to relatively high temperatures (e.g., about 210° C.) for a short time period (e.g., about 12 seconds) hydrolyzed to hexose and pentose in high yield. Continuous removal of the pentose reaction product and adjustment of the reaction conditions (e.g., about 190° C. for about 20 minutes) can provide optimal production of levulinic acid from hexose.

Work at the University of Wisconsin provides another promising future direction for industrial scale levulinic acid production. See, e.g., U.S. Pat. No. 8,389,749 to Dumesic, herein incorporated by reference. It was recognized that it is advantageous to not only separate the biomass hydrolysis to sugars from levulinic acid production, but also to continuously separate the intermediate hydroxymethylfurfural from the aqueous hydrolysis environment. This was accomplished by a biphasic reactor design where the hydroxymethylfurfural is continuously extracted into an organic solvent (2-sec butyl phenol) and transported into another biphasic reaction vessel where the hydroxymethylfurfural to levulinic acid reaction conditions have been optimized and the resulting product is continuously removed. Alternative solvents such as gamma valerolactone are also being researched as a more environmentally acceptable reaction medium for this process. See, e.g., Alonso, D, Energy Environ. Sci., 2013, 6, 76-80, herein incorporated by reference.

Lactic Acid

As described above, tobacco-derived cellulosic materials can undergo enzymatic hydrolysis to form a hydrolyzed tobacco product (i.e., a liquid mash) comprising residual solids and a liquid comprising at least one tobacco-derived cellulosic sugar. As illustrated at operation 114 of FIG. 1, for example, the process can further comprise separating the residual solids and the liquids, adding a high-protein medium to the liquids, and allowing the liquids and the high-protein medium to ferment and form a fermented product comprising lactic acid. As illustrated at operation 108 of FIG. 1, for example, lactic acid can also be produced from a conversion and recovery process of xylose.

Lactic acid fermentation is performed by lactic acid bacteria, which convert simple carbohydrates such as glucose, sucrose, or galactose to lactic acid. Lactic acid bacterial (LAB) (also referred to as lactobacillales) are a branch of Gram-positive, non-spreforming cocci, coccobacilli or rods with a DNA base composition of less than 53 mol % G+C (Guanine+Cytosine). They are generally non respiratory and lack catalase. They ferment glucose primarily to lactic acid, or to lactic acid $CO_2$ and ethanol. In homolactic fermentation, one molecule of glucose is ultimately converted to two molecules of lactic acid. In heterolactic fermentation, carbon dioxide and ethanol are produced in addition to lactic acid, in a process called the phosphoketolase pathway. Although many genera of bacteria produce lactic acid as a primary or secondary end-product of fermentation, the term "Lactic Acid Bacteria" is conventionally reserved for genera in the order Lactobacillales, which includes *Lactobacillus, Leuconostoc, Pediococcus, Lactococcus* and *Streptococcus*, in addition to *Carnobacterium, Enterococcus, Oenococcus, Tetragenococcus, Vagococcus,* and *Weisella*. Two common applications of lactic acid fermentation are in the production of yogurt and sauerkraut, for example.

Lactic acid can be useful as a monomer for producing polylactic acid (PLA), which has many applications as a biodegradable polymer. Smokeless tobacco products, for example, can incorporate tobacco-derived PLA in materials useful for forming exterior pouches to house tobacco compositions. Smoking articles can incorporate tobacco-derived PLA in filters, for example. Tobacco products can also include lactic acid in tobacco compositions and aerosol precursor compositions as a preservative, a curing agent, and/or a flavoring agent. Lactic acid can also be used in pharmaceutical technology to produce water-soluble lactates from otherwise-insoluble active ingredients. Lactic acid can be useful in topical preparations and cosmetics to adjust acidity and for its disinfectant and keratolytic properties. Lactic acid can be useful as a food preservative, curing agent and a flavoring agent. Lactic acid can also be useful in detergents as a soap-scum remover and an anti-bacterial agent. Lactic acid in combination with ammonium bicarbonate is used in the Lurex® brand mosquito attractant. In general, lactic acid is beneficial as a relatively environmentally safe and natural ingredient in many different products.

Ethanol

As described above, tobacco-derived cellulosic materials can undergo enzymatic hydrolysis to a hydrolyzed tobacco product (i.e., a liquid mash) comprising residual solids and a liquid comprising at least one tobacco-derived cellulosic sugar. As illustrated at operation 114 of FIG. 1, for example, the process can further comprise separating the residual solids and the liquids, adding a yeast to the liquids, and allowing the liquids and the yeast to ferment and form a fermented product comprising ethanol.

Ethanol (also referred to as ethyl alcohol) is the principal type of alcohol found in alcoholic beverages. Ethanol can also be useful as a solvent, an antiseptic, a fuel, and the active fluid in modern thermometers, for example. Ethanol for use as an industrial feedstock or solvent is often made from the acid-catalyzed hydration of ethylene. Ethanol for use in alcoholic beverages and the vast majority of ethanol for use as fuel is produced by fermentation.

With regard to ethanol fermentation, when certain species of yeast (e.g., *Saccharomyces cerevisiae*) metabolize sugar (e.g., glucose) in reduced-oxygen conditions, they produce ethanol and carbon dioxide. This process can be carried out at about 35-40° C., for example. Toxicity of ethanol to yeast can limit the ethanol concentration obtainable by brewing. As such, fortification or distillation processes can be used to obtain higher ethanol concentrations.

As discussed above, cellulose-bearing materials (e.g., roots and/or stems of a tobacco plant) typically contain other polysaccharides, including hemicellulose. Hydrolysis of hemicellulose provides five-carbon sugars such as xylose. *S. cerevisiae*, the yeast most commonly used for ethanol production, cannot metabolize xylose. As such, in certain embodiments, the concentration of xylose in the hydrolyzed product can be reduced via enzymatic treatment prior to undergoing an ethanol fermentation process.

Uses of Tobacco-Derived Cellulosic Sugar Materials in Tobacco Products

As described above, cellulosic sugar materials generated according to the present invention can be useful in producing various products derived from tobacco glucose including, but not limited to, humectants, fillers, flavorants and various acids. Cellulosic sugar materials and other downstream products generated according to the process of the invention can be useful as components incorporated into tobacco products for example. The tobacco product to which the materials of the invention are added can vary, and can include any product configured or adapted to deliver tobacco or some component thereof to the user of the product. Exemplary tobacco products include smoking articles (e.g., cigarettes), smokeless tobacco products, and aerosol-generating devices that contain a tobacco material or other plant material that is not combusted during use.

In various embodiments, products derived from the cellulosic sugar materials, in particular, tobacco glucose, can be incorporated into smoking articles in the form of a flavorant, a filler, and/or a humectant in a smokable filler material. In some embodiments, lactic acid derived from cellulosic sugar materials of the invention can be used for producing polylactic acid, which can be useful in filtration products, including filters in smoking articles, for example.

Figure 2:
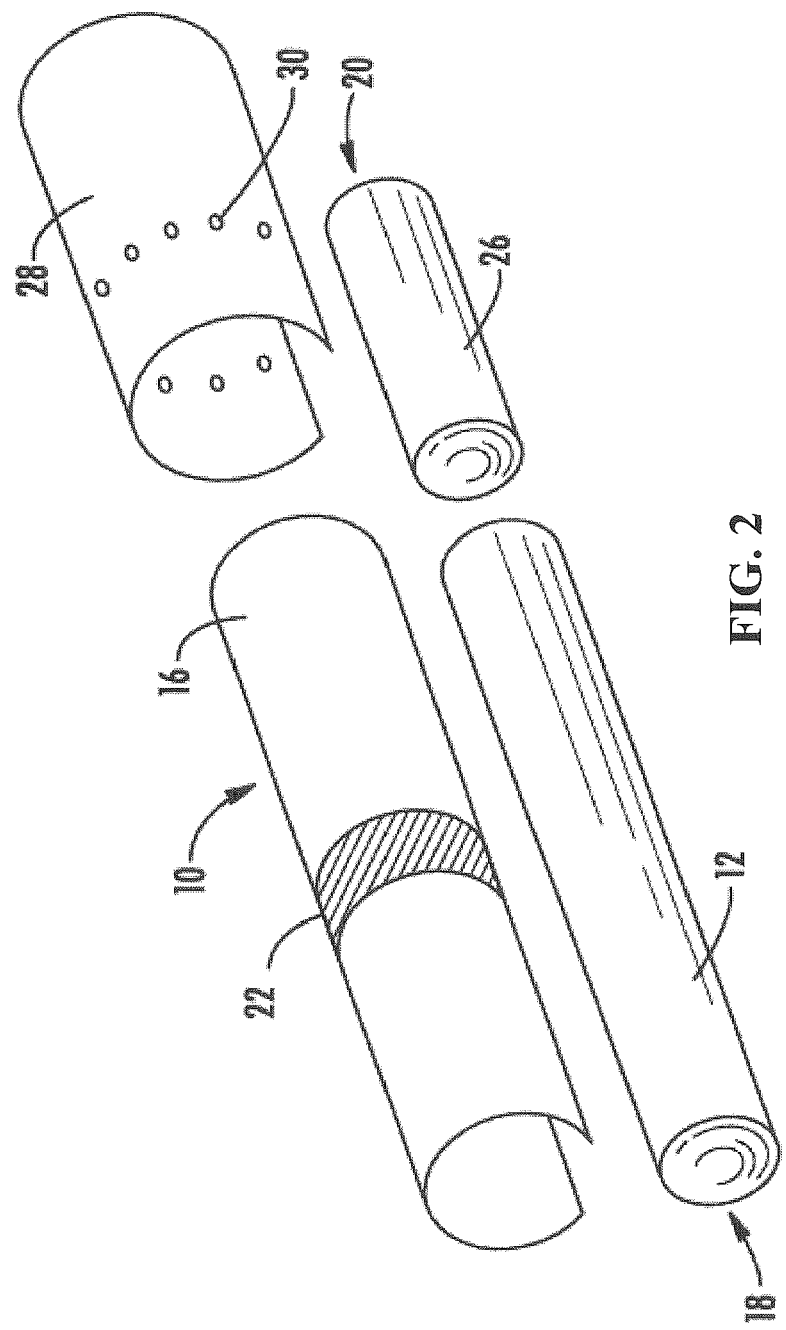
FIG. 2 is an exploded perspective view of a smoking article having the form of a cigarette, showing the smokable material, the wrapping material components, and the filter element of the cigarette.

Referring to FIG. 2, there is shown a smoking article 10 in the form of a cigarette and possessing certain representative components of a smoking article that can contain products derived from the cellulosic sugar materials of the present invention. The cigarette 10 includes a generally cylindrical rod 12 of a charge or roll of smokable filler material (e.g., about 0.3 to about 1.0 g of smokable filler material such as tobacco material) contained in a circumscribing wrapping material 16. The rod 12 is conventionally referred to as a "tobacco rod." The ends of the tobacco rod 12 are open to expose the smokable filler material. The cigarette 10 is shown as having one optional band 22 (e.g., a printed coating including a film-forming agent, such as starch, ethylcellulose, or sodium alginate) applied to the wrapping material 16, and that band circumscribes the cigarette rod in a direction transverse to the longitudinal axis of the cigarette. The band 22 can be printed on the inner surface of the wrapping material (i.e., facing the smokable filler material), or less preferably, on the outer surface of the wrapping material.

At one end of the tobacco rod 12 is the lighting end 18, and at the mouth end 20 is positioned a filter element 26. The filter element 26 positioned adjacent one end of the tobacco rod 12 such that the filter element and tobacco rod are axially aligned in an end-to-end relationship, preferably abutting one another. Filter element 26 may have a generally cylindrical shape, and the diameter thereof may be essentially equal to the diameter of the tobacco rod. The ends of the filter element 26 permit the passage of air and smoke therethrough. A plug wrap 28 enwraps the filter element and a tipping material (not shown) enwraps the plug wrap and a portion of the outer wrapping material 16 of the rod 12, thereby securing the rod to the filter element 26.

The filter element of the invention typically comprises multiple longitudinally extending segments. Each segment can have varying properties and may include various materials capable of filtration or adsorption of particulate matter and/or vapor phase compounds. Typically, the filter element of the invention includes 2 to 6 segments, frequently 2 to 4 segments. In one preferred embodiment, the filter element includes a mouth end segment, a tobacco end segment and a compartment therebetween. This filter arrangement is sometimes referred to as a "compartment filter" or a "plug/space/plug" filter. The compartment may be divided into two or more compartments as described in greater detail below.

In various embodiments, the filter element can comprise an adsorbent in the form of an activated carbon material, wherein the activated carbon is capable of removing at least one gas phase component of mainstream smoke is incorporated into the filter element. In certain embodiments, the filter element 26 can include ventilation holes 30 that extend through the tipping paper (not shown) and the plug wrap 28 and, thus, provide air dilution of mainstream smoke. The ventilation holes 30 may be configured as a single line of perforations extending circumferentially around the filter element 26 or may comprise several lines of perforations. As would be understood, the exact count and size of the ventilation holes 30 will vary depending on the desired level of air dilution.

In various embodiments, products derived from the cellulosic sugar materials, in particular, tobacco glucose, can be incorporated into smokeless tobacco products in the form of a flavorant, a filler, and/or a humectant in a smokeless tobacco formulation. In some embodiments, lactic acid derived from cellulosic sugar materials of the invention can be used for producing polylactic acid, which can be useful in nonwoven products, including nonwoven fabrics useful in pouched products, for example.

Figure 3:
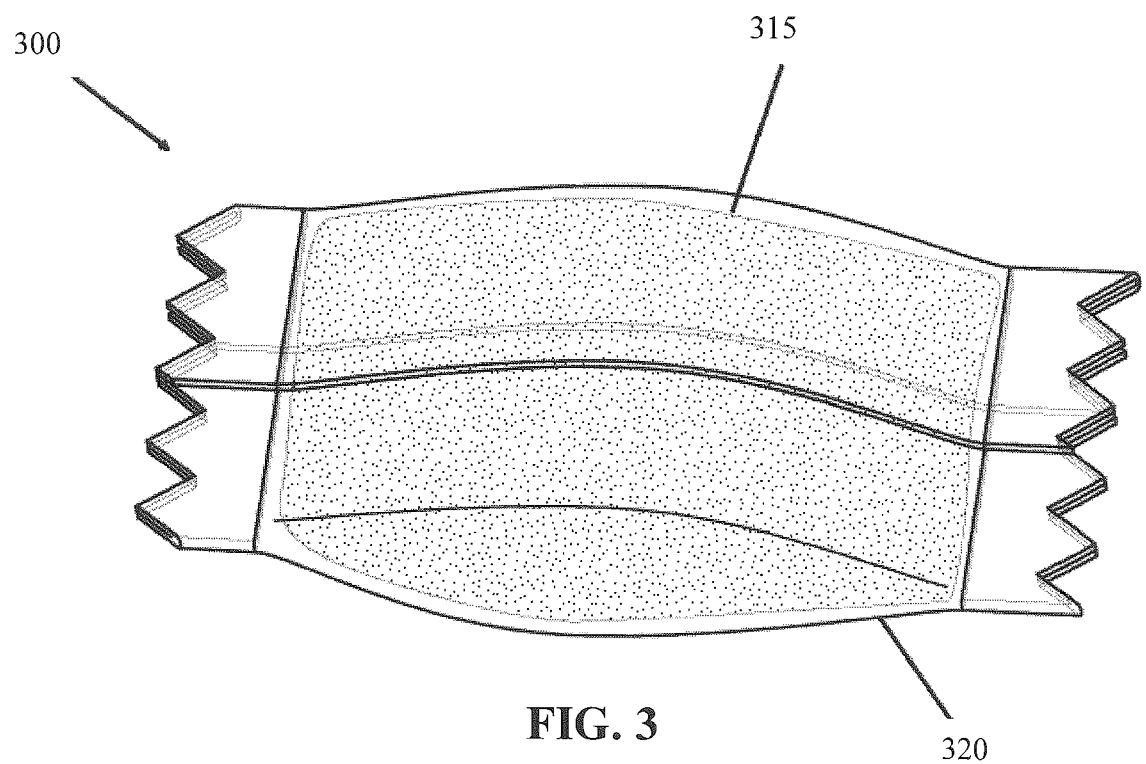
FIG. 3 is a top view of a smokeless tobacco product embodiment, taken across the width of the product, showing an outer pouch filled with a tobacco material.

The form of the smokeless tobacco product of the invention can vary. In one particular embodiment, the product is in the form of a snus-type product containing a particulate tobacco material and a flavorant, a filler, and/or a humectant derived from tobacco glucose. Manners and methods for formulating snus-type tobacco formulations will be apparent to those skilled in the art of snus tobacco product production. For example, as illustrated in FIG. 3, an exemplary pouched product 300 can comprise an outer water-permeable container 320 in the form of a pouch which contains a particulate mixture 315 adapted for oral use. The orientation, size, and type of outer water-permeable pouch and the type and nature of the composition adapted for oral use that are illustrated herein are not construed as limiting thereof.

In various embodiments, a moisture-permeable packet or pouch can act as a container for use of the composition within. The composition/construction of such packets or pouches, such as the container pouch 320 in the embodiment illustrated in FIG. 3, may be varied as noted herein. For example, suitable packets, pouches or containers of the type used for the manufacture of smokeless tobacco products, which can be modified according to the present invention, are available under the tradenames CatchDry, Ettan, General, Granit, Goteborgs Rape, Grovsnus White, Metropol Kaktus, Mocca Anis, Mocca Mint, Mocca Wintergreen, Kicks, Probe, Prince, Skruf and TreAnkrare. A pouch type of product similar in shape and form to various embodiments of a pouched product described herein is commercially available as ZONNIC (distributed by Niconovum AB). Additionally, pouch type products generally similar in shape and form to various embodiments of a pouched product are set forth as snuff bag compositions E-J in Example 1 of PCT WO 2007/104573 to Axelsson et al., which is incorporated herein by reference, which are produced using excipient ingredients and processing conditions that can be used to manufacture pouched products as described herein.

The amount of material contained within each pouch may vary. In smaller embodiments, the dry weight of the material within each pouch is at least about 50 mg to about 150 mg. For a larger embodiment, the dry weight of the material within each pouch preferably does not exceed about 300 mg to about 500 mg. The material within each pouch can comprise a flavorant, a filler and/or a humectant derived from glucose produced from raw tobacco materials.

In some embodiments, each pouch/container may have disposed therein a flavor agent member, as described in greater detail in U.S. Pat. No. 7,861,728 to Holton, Jr. et al., which is incorporated herein by reference. The flavor agent member can comprise a flavorant derived from tobacco glucose, as discussed above. If desired, other components can be contained within each pouch. For example, at least one flavored strip, piece or sheet of flavored water dispersible or water soluble material (e.g., a breath-freshening edible film type of material) may be disposed within each pouch along with or without at least one capsule. Such strips or sheets may be folded or crumpled in order to be readily incorporated within the pouch. See, for example, the types of materials and technologies set forth in U.S. Pat. No. 6,887,307 to Scott et al. and U.S. Pat. No. 6,923,981 to Leung et al.; and The EFSA Journal (2004) 85, 1-32; which are incorporated herein by reference.

In various embodiments, the outer water-permeable pouch can comprise PLA produced from lactic acid derived from tobacco glucose. Descriptions of various components of snus types of products and components thereof also are set forth in US Pat. App. Pub. No. 2004/0118422 to Lundin et al., which is incorporated herein by reference. See, also, for example, U.S. Pat. No. 4,607,479 to Linden; U.S. Pat. No. 4,631,899 to Nielsen; U.S. Pat. No. 5,346,734 to Wydick et al.; and U.S. Pat. No. 6,162,516 to Den, and US Pat. Pub. No. 2005/0061339 to Hansson et al.; each of which is incorporated herein by reference. See, also, the types of pouches set forth in U.S. Pat. No. 5,167,244 to Kjerstad, which is incorporated herein by reference. Snus types of products can be manufactured using equipment such as that available as SB 51-1/T, SBL 50 and SB 53-2/T from Merz Verpackungmaschinen GmBH. Snus pouches can be provided as individual pouches, or a plurality of pouches (e.g., 2, 4, 5, 10, 12, 15, 20, 25 or 30 pouches) can connected or linked together (e.g., in an end-to-end manner) such that a single pouch or individual portion can be readily removed for use from a one-piece strand or matrix of pouches.

The invention is not limited to snus-type smokeless tobacco products. For example, the mixture of tobacco material and flavorants, fillers and/or humectants derived from tobacco glucose can also be incorporated into various smokeless tobacco forms such as loose moist snuff, loose dry snuff, chewing tobacco, pelletized tobacco pieces, extruded tobacco strips or pieces, finely divided or milled agglomerates of powdered pieces and components, flake-like pieces (e.g., that can be formed by agglomerating tobacco formulation components in a fluidized bed), molded tobacco pieces (e.g., formed in the general shape of a coin, cylinder, bean, cube, or the like), pieces of tobacco-containing gum, products incorporating mixtures of edible material combined with tobacco pieces and/or tobacco extract, products incorporating tobacco (e.g., in the form of tobacco extract) carried by a solid inedible substrate, and the like. For example, the smokeless tobacco product can have the form of compressed tobacco pellets, multi-layered extruded pieces, extruded or formed rods or sticks, compositions having one type of tobacco formulation surrounded by a different type of tobacco formulation, rolls of tape-like films, readily water-dissolvable or water-dispersible films or strips (see, for example, US Pat. Appl. Pub. No. 2006/0198873 to Chan et al.), or capsule-like materials possessing an outer shell (e.g., a pliable or hard outer shell that can be clear, colorless, translucent or highly colored in nature) and an inner region possessing tobacco or tobacco flavor (e.g., a Newtoniam fluid or a thixotropic fluid incorporating tobacco of some form).

In some embodiments, smokeless tobacco products of the invention can have the form of a lozenge, tablet, microtab, or other tablet-type product. See, for example, the types of lozenge formulations and techniques for formulating or manufacturing lozenges set forth in U.S. Pat. No. 4,967,773 to Shaw; U.S. Pat. No. 5,110,605 to Acharya; U.S. Pat. No. 5,733,574 to Dam; U.S. Pat. No. 6,280,761 to Santus; U.S. Pat. No. 6,676,959 to Andersson et al.; U.S. Pat. No. 6,248,760 to Wilhelmsen; and U.S. Pat. No. 7,374,779; US Pat. Pub. Nos. 2001/0016593 to Wilhelmsen; 2004/0101543 to Liu et al.; Pat. Pub. No. 2006/0120974 to Mcneight; Pat. Pub. No. 2008/0020050 to Chau et al.; Pat. Pub. No. 2009/0081291 to Gin et al.; and Pat. Pub. No. 2010/0004294 to Axelsson et al.; which are incorporated herein by reference.

Depending on the type of smokeless tobacco product being processed, the tobacco product can include one or more additional components in addition to the tobacco material and the flavorants, fillers and/or humectants derived from tobacco glucose. For example, the tobacco material and the flavorants, fillers and/or humectants derived from tobacco glucose can be processed, blended, formulated, combined and/or mixed with other materials or ingredients, such as other tobacco materials or flavorants, fillers, binders, pH adjusters, buffering agents, salts, sweeteners, colorants, disintegration aids, humectants, and preservatives (any of which may be an encapsulated ingredient). See, for example, those representative components, combination of components, relative amounts of those components and ingredients relative to tobacco, and manners and methods for employing those components, set forth in US Pat. Pub. Nos. 2011/0315154 to Mua et al. and Pat. Pub. No. 2007/0062549 to Holton, Jr. et al. and U.S. Pat. No. 7,861,728 to Holton, Jr. et al., each of which is incorporated herein by reference.

In various embodiments, products derived from the cellulosic sugar materials, in particular, tobacco glucose, can be incorporated into smokeless tobacco products in the form of a flavorant, a filler, and/or a humectant in an electronic smoking article. There have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices and heat generating sources set forth in the background art described in U.S. Pat. No. 7,726,320 to Robinson et al., U.S. Pat. Pub. Nos. 2013/0255702 to Griffith Jr. et al., Pat. Pub. No. 2014/0000638 to Sebastian et al., Pat. Pub. No. 2014/0060554 to Collett et al., Pat. Pub. No. 2014/0096781 to Sears et al., Pat. Pub. No. 2014/0096782 to Ampolini et al., and U.S. Pat. App. Ser. No. 14/011,992 to Davis et al., filed Aug. 28, 2013, which are incorporated herein by reference in their entirety.

Figure 4:
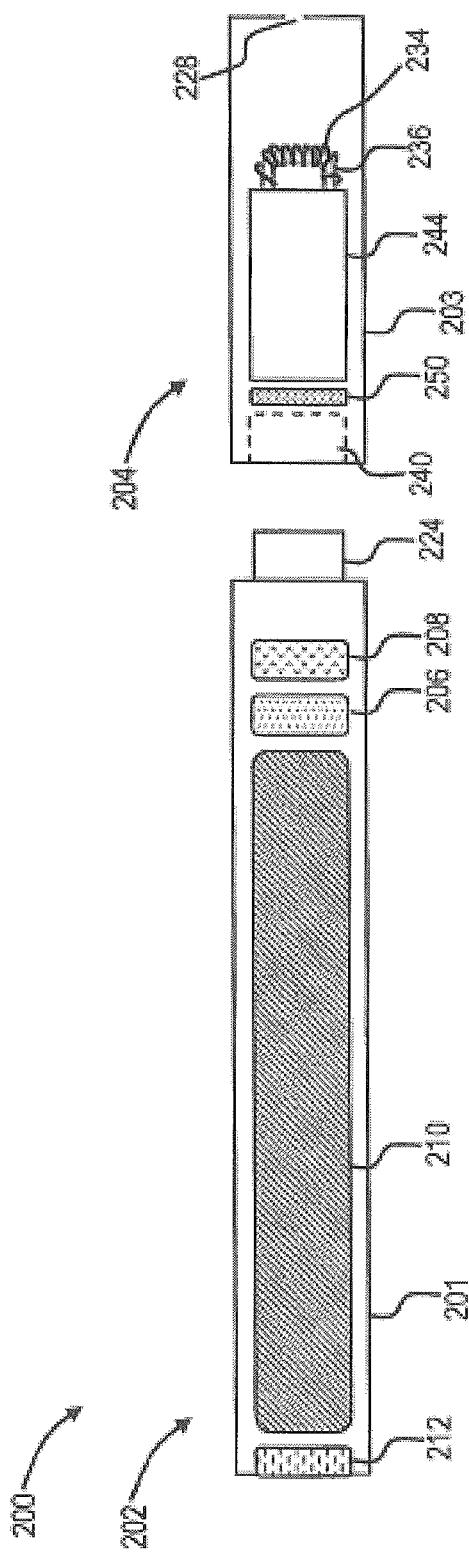
FIG. 4 is a sectional view through an electronic smoking article comprising a cartridge and a control body and including a reservoir housing according to an example embodiment of the present disclosure.

An exemplary embodiment of an electronic smoking article 200 is shown in FIG. 4. As illustrated therein, a control body 202 can be formed of a control body shell 201 that can include a control component 206, a flow sensor 208, a battery 210, and an LED 212. A cartridge 204 can be formed of a cartridge shell 203 enclosing a reservoir housing 244 that is in fluid communication with a liquid transport element 236 adapted to wick or otherwise transport an aerosol precursor composition stored in the reservoir housing to a heater 234. An opening 228 may be present in the cartridge shell 203 to allow for egress of formed aerosol from the cartridge 204. Such components are representative of the components that may be present in a cartridge and are not intended to limit the scope of cartridge components that are encompassed by the present disclosure. The cartridge 204 may be adapted to engage the control body 202 through a press-fit engagement between the control body projection 224 and the cartridge receptacle 240. Such engagement can facilitate a stable connection between the control body 202 and the cartridge 204 as well as establish an electrical connection between the battery 210 and control component 206 in the control body and the heater 234 in the cartridge. The cartridge 204 also may include one or more electronic components 250, which may include an IC, a memory component, a sensor, or the like. The electronic component 250 may be adapted to communicate with the control component 206. The various components of an electronic smoking device according to the present disclosure can be chosen from components described in the art and commercially available.

In various embodiments, the aerosol precursor composition can comprise a tobacco-derived cellulosic sugar or a downstream product of a tobacco-derived sugar selected from the group consisting of glucose, glucose syrup, high fructose tobacco syrup, glycerol, lactic acid, levulinic acid, sorbitol, and combinations thereof. Exemplary formulations for aerosol precursor materials that may be used according to the present disclosure are described in U.S. Pat. No. 7,217,320 to Robinson et al.; U.S. Pat. Pub. Nos. 2013/0008457 to Zheng et al.; Pat. Pub. No. 2013/0213417 to Chong et al.; Pat. Pub. No. 2014/0060554 to Collett et al.; and Pat. Pub. No. 2014/0000638 to Sebastian et al., the disclosures of which are incorporated herein by reference in their entirety. Other aerosol precursors that can incorporate the cellulosic sugars and downstream products thereof described herein include the aerosol precursors that have been incorporated in the VUSE® product by R. J. Reynolds Vapor Company, the BLU™ product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

EXPERIMENTAL

Aspects of the present invention are more fully illustrated by the following examples, which are set forth to illustrate certain aspects of the present invention and are not to be construed as limiting thereof.

Example 1

Glucose is produced from raw tobacco materials. Three sets of delignifications and saccharifications are performed. Each set consists of grinding (mechanically pulping) tobacco stalk biomass for two delignifications in a large delignification draft tube tank with a rough working volume of about 60 gallons. 14 kilograms (dry weight) of tobacco stalk is used in each delignification. After grinding the tobacco stalk biomass, 10 kg of delignified pulp remains for each delignification.

The delignified pulp is then rinsed, dewatered, and rinsed again. The pH is adjusted to 4.8, and then the pulp is dewatered again to obtain a pulp ready for enzymatic saccharification. A two addition saccharification is performed, starting with 5% solids and a 5% enzyme loading level on a dry weight basis. After this runs for 24 hours a second addition of pulp is added to the mash and run for an additional 24 hours.

The residual solids are removed from the mash and the liquids are moved to the evaporator to condense. The resultant concentrated glucose syrup has a sugar makeup of 84.4% by weight glucose and 15.6% xylose by weight.

Example 2

A glucose syrup having a reduced xylose concentration is produced from raw tobacco materials. The process described in Example 1 above is followed to produce a glucose syrup. However, in order to eliminate the xylose from the syrup xylanases are used to remove the hemicellulose before the final saccharification. Three different types of xylanase enzymes are used (Rhyzyme®, Pulpzyme® HC & HC 2500, Dyadic® Xylanase, and combinations thereof).

Pulpzyme® HC & HC 2500 is the only enzyme that released xylose and no glucose. However, the release of xylose was lower than desired. Adding another xylanase enzyme showed good hydrolysis of the hemicellulose but also equal hydrolysis of cellulose. However, a combination of xylanases enabled removal of half of the still available hemicellulose in this step, which lowered the xylose in the glucose syrup by about 50%, but did not eliminate it.

Example 3

High fructose tobacco syrup is produced using commercial immobilized glucose isomerase (also referred to as Sweetzyme type IT®). The experiment is conducted at 55° C. and an initial tobacco glucose concentration of 13%. The enzyme (45 g) is hydrated prior to adding it to 4 L of Tris-buffer media (pH 7.5) containing the glucose. Fructose production is approximately 0.5 g g−1. Final glucose and fructose concentrations are 275 g/L and 225 g/L, respectively. This reaction shows a good fit between experimental data and model prediction (Gaily, M. H., et al. Production of fructose from highly concentrated date extracts using *Saccharomyces cerevisiae*. Biotechnology Letters, 2013).

Example 4

Glycerol is produced from raw tobacco materials. Tobacco stalk biomass is ground (mechanically pulped) for delignification in a large delignification draft tube tank with a rough working volume of about 60 gallons. The delignified pulp is then rinsed, dewatered, and rinsed again. The pH is adjusted to 4.8, and then the pulp is dewatered again to obtain a pulp ready for enzymatic saccharification. Saccharification of delignified tobacco pulp using a strong loading (3% by weight) of Cellic® CTec 3 (produced by Novozymes A/S) enzyme provides the tobacco glucose for the glycerol production.

The tobacco pulp slurry (9 percent solids) is hydrolyzed for 24 hours prior to adding 10 g/L fast-rise baker's yeast. Nutrients and hops supplement the media as well. A low dosage of bisulfite (2000 ppm) in the form of $Na_2S_2O_5$ is added periodically throughout the reaction in order to fix acetaldehyde and increase glycerol production by yeast. The pH is held between 6.7 and 7.3 using a pH controller and AmOH2 in order to stabilize the bisulfite concentration in a pH range tolerable to yeast. Over 100 g of glycerol is produced at an average yield of 13% based on the weight of the pulp. A weak base anion is used on the solution to remove any lactic acid impurities.

Example 5

Sorbitol is produced from tobacco-derived glucose. The process described in Example 1 above is followed to produce a glucose syrup. The conditions outlined by Gallezot, P., J. Catal. 146 (1994) 93 and Hoffer, B. W., Tuning Raney-type and Supported Ni Catalysts for Commercial Hydrogenation reactions. Thesis, Delft University of Technology, Delft, The Netherlands, 2003, are followed to design a reduction of tobacco derived glucose into sorbitol. Critical parameters such as catalyst type, precursor concentration, $H_2$ pressure, reaction temperature and purge cycling are adapted for use in the reaction.

Specifically, the reduction of tobacco glucose to sorbitol in our hands is as follows. Tobacco derived glucose, (brix 34.9 approx. 100 g, 0.55M) is present in $H_2O$, giving a solution volume of 250 mL The pH is adjusted to 6.5 with 0.1M acetic acid and Mo alloyed Raney Nickel (W. R. Grace 3202, 3 g) is added to the solution. The reaction mixture is placed in a 600 ml stainless steel Parr stirred autoclave equipped with a thermocouple controlled heating mantle and a purge system adapted from a Parr shaking hydrogenation apparatus. The reaction vessel is exposed to 3 vacuum evacuation/$H_2$ fill cycles to purge oxygen from the system. The purge system is disconnected and hydrogen is added to a pressure of 800 psig (5.5 mPa). Stirring is commenced (1000 rpm) and the reaction is rapidly heated to 120° C. The reaction requires that the hydrogen pressure level be returned to 800 psi 3 times from 580 psi (4 mPa) over a period of 2.5 hrs., by which time $H_2$ uptake had ceased. The reaction vessel is rapidly cooled in a water bath to 25° C. and the $H_2$ pressure is cautiously released. The vessel is vacuum purged to reduce the amount of $H_2$ dissolved in solution. The autoclave is opened, the magnetic Raney Nickel is held at the bottom of the lower half of the autoclave with a powerful magnet and the reaction solution is decanted into an Erlenmeyer flask. The catalyst is washed with Distilled $H_2O$ and the washes are combined with the product. The catalyst is left immersed in water. The aqueous solution is vacuum filtered through a pad of Celite on a fritted funnel to remove any non-magnetic nickel particles.

The reaction is repeated twice and due to the nature of the catalyst washing process, the final solutions have slightly different volumes and therefore different sorbitol concentrations. HPLC analysis showed that run 1 has a sorbitol concentration of 150 g/L and run 2 has a sorbitol concentration of 173 g/L. The resulting solutions are clear and white.

Example 6

Levulinic acid is produced from tobacco biomass. The process described in Example 1 above is followed to produce glucose from raw tobacco materials. The conditions outlined by Du, X., Angew. Chem. 2011, 123, 7961-7965 and Runge, T, Ind. Eng. Chem. Res. 2012, 51, 3265-3270, both of which are herein incorporated by reference, are adapted for the hydrolysis portion of the levulinic acid synthesis. Most of the modern literature uses levulinic acid as a feedstock for other reactions, so there are few isolation procedures in the modern literature. U.S. Pat. No. 4,612,391 to Edwards, herein incorporated by reference, describes a process wherein acidic and basic solutions are extracted with organic solvents to purify the product. This process is adapted by substituting ethyl acetate in place of the environmentally undesirable chlorinated solvents proposed therein.

Levulinic acid samples are produced as follows. Glucose (44.6 g, 0.248 Moles) is solutioned in 0.5M H2SO4 (230 mL) and loaded into a 500 mL Teflon lined 1 stainless steel stirred autoclave. The autoclave is heated to 170° C. quickly (approximately 30 minutes) and stirred vigorously for 45 minutes after the target temperature is reached. The mantle is removed and the autoclave is rapidly cooled in a water bath. When the apparatus reaches 40° C., it is placed in a ring stand and the top is removed. The reaction mixture is poured into a 500 mL Erlenmeyer flask and is transported to the laboratory. HPLC analysis at this point gives a levulinic acid concentration of 15-16 g/L. The acidic solution is brought to pH 1 by the addition of CaO (5 g) for removal of $H_2SO_4$ and insoluble humins. The resultant $CaSO_4$ is filtered off, the cake washed with DI H2O and the aqueous solution containing levulinic acid and formic acid is extracted with ethyl acetate (3×100 mL). The organics are washed with brine and the ethyl acetate is removed by rotary evaporation. Additional water is added to the residue to ensure that all the formic acid is removed as an azeotrope. The residue is dissolved in 3N NaOH (150 mL) and washed with ethyl acetate for removal of organic compounds that are not carboxylic acids via Na salt formation. The basic aqueous solution is acidified to pH 1 with concentrated HCL and the acidic solution is extracted with ethyl acetate (3×100 mL) for removal of water soluble salts and the recovery of the product. The organic solution is dried by washing with a saturated brine solution, and the organic solvent is removed by rotary evaporation. The products of repeated reactions are pooled and the crude levulinic acid is treated with activated charcoal to remove color.

Example 7

Lactic acid is produced from tobacco biomass. The process described in Example 1 above is followed to produce glucose from raw tobacco materials.

A successful lactic acid yield is observed with greater than 90 percent conversion of tobacco-derived glucose to lactic acid. Partially refined tobacco glucose (82 g/L) is fermented in a 12 L reactor with a high-protein medium until the sugars are completely removed. The pH is maintained at 6.5+/−0.2 using $CaOH_2$ and a pH controller. Temperature is held at 38° C. The medium is inoculated with a 10 g/L bacteria composition including live cultures of S. thermophiles, L. bulgaricus, L. acidophilus, Bifidus, L. casei, and L. rhamnosus. The fermentation is completed in less than 48 hours.

Upon completion, the pH of the fermentation broth is increased to 10.15 using $CaOH_2$, followed by heating the reactor to 50° C. in order to kill organisms present and coagulate the proteinaceous material for improved filtering. Calcium lactate is then decomposed with sulfurit acid and calcium sulfate (precipitate) is removed. The lactic acid solution is concentrated to 15%, bleached with activated carbon, and then concentrated to 33%. Using a more refined tobacco glucose (e.g., cleaned with activated carbon prior to use) and fermenting for 5-10 days in very-low-protein medium can improve this procedure.

Example 8

Ethanol is produced from tobacco biomass. As described above in Example 1, tobacco-derived cellulosic materials undergo enzymatic hydrolysis to form a hydrolyzed tobacco product (i.e., a liquid mash) comprising residual solids and a liquid comprising glucose. The residual solids and the liquids are separated, a yeast is added to the liquids, and the liquids and the yeast are allowed to ferment and form a fermented product comprising ethanol.

With regard to the fermentation of tobacco-derived glucose, a 20 liter reactor vessel is filled with 14 L of 22 brix tobacco-stem-derived glucose/xylose (produced according to Example 1). Nutrients and buffer are added, followed by yeast (a proprietary Saccharomyces floc strain developed by BPI). The syrup is allowed to ferment for 48 hours, after which an HPLC analysis indicates about 100 g/L ethanol and little to no residual glucose. The analysis also shows about 13 g/L glycerol is produced as a natural 'side-product' of the ethanol fermentation.

With regard to the ethanol distillation, a distillation column is designed and built for the recovery and purification of the tobacco-stem ethanol. The column is fabricated out of 2" stainless steel tubing and then packed with a stainless steel mesh type packing. The stripping section (below the feed) is 50 cm in length, and the rectifier (above the feed) is 100 cm in length. The feed and bottoms out are controlled by a variable speed Masterflex pump with two heads, one used to pump the feed to the middle of the column, and one used to pump out the 'bottoms' from the reboiler. The reflux rate is determined based on the concentration of the feed.

With regard to ethanol recovery, the 14 L of 25 brix tobacco-stem glucose/xylose ferments to 95 g/L ethanol and is then boiled with a condenser to remove about 50% of the volume. This results in 6 L of residual fermentation broth comprising concentrated ethanol solution and concentrated residual xylose/glycerol solution. 7 L of condensate is recovered, with the first 3.5 L at 20% ethanol, and the second 3.5 L condensate at 5% ethanol. A HPLC analysis of the 14 L indicates that about 12 g/L of glycerol is produced as a by-product, which can be recovered.

Next, a proprietary Bio Process Innovations (West Lafayette, Ill.) xylose metabolizing yeast strain is added to the concentrated fermentation broth and added air with the intent of removing the xylose (converting xylose to yeast cell mass), and leaving basically only glycerol (along with yeast and unconsumed nutrients). Some inhibitors in the concentrated broth did not allow the xylose yeast to grow and consume the xylose. It is possible that the high heat 'boil-off' taking over 4 hours caused the formation of inhibitors, or that just the concentration of the broth made some inhibitors left over from the enzymes (or by-products from the fermentation) high enough to more or less stop the fermentation. The final 7 L is discarded without recovering the glycerol.

The 3.5 L of 20% ethanol is diluted to about 14% ethanol by combining 2 L of 5% (second bottle) with the 3.5 L of 20%. The column is heated up with 1 L of water and 1 L of 5% ethanol (second bottle) in the reboiler. Once the column is hot, the condensation rate is measured at around 2 to 3 ml/minute, which is quite a bit lower than the design rate of 30 ml/min. The column is therefore insulating, increasing the condensation rate up to 5.5 ml/min. The reflux rate is set at 2.5 ml/min and the column is run for about 12 hours, with a net result of 1.3 L of 165 proof ethanol. Adding another 'bayonet' type heater to the reboiler should increase the boil-up by 150% to about 15 ml/min condensate.

Many modifications and other embodiments of the invention will come to mind to one skilled in the art to which this invention pertains having the benefit of the teachings presented in the foregoing description. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of forming cellulosic sugars from the stalk or roots of a plant of the *Nicotiana* species, comprising:
   i) receiving a tobacco material comprising at least one of a stalk material and a root material of a harvested plant of the *Nicotiana* species;
   ii) delignifying the tobacco material to form a tobacco-derived cellulosic pulp and lignin;
   iii) separating the tobacco-derived cellulosic pulp from the lignin; and
   iv) hydrolyzing the tobacco-derived cellulosic pulp to form a hydrolyzed tobacco product comprising residual solids and a liquid comprising at least one tobacco-derived cellulosic sugar;
   wherein the step of delignifying the tobacco material further comprises adjusting the pH of the tobacco-derived cellulosic pulp to a value in the range of about 4.5 to about 5.5; and
   wherein the step of hydrolyzing the tobacco-derived cellulosic pulp comprises a single enzymatic saccharification of the tobacco-derived cellulosic pulp in the presence of at least one enzyme.

2. The method of claim 1, wherein the tobacco material comprises at least about 90 percent by dry weight of at least one of the stalk material and the root material of the harvested plant of the *Nicotiana* species.

3. The method of claim 1, wherein the step of delignifying the tobacco material comprises grinding at least one of the stalk material and the root material of a harvested plant of the *Nicotiana* species to form the tobacco-derived pulp.

4. The method of claim 3, wherein the step of delignifying the tobacco material further comprises rinsing the tobacco-derived cellulosic pulp, and wherein the step of separating the tobacco-derived cellulosic pulp from the lignin comprises dewatering the tobacco-derived cellulosic pulp.

5. The method of claim 1, further comprising drying the tobacco-derived cellulosic pulp to at least 10% moisture content or less.

6. The method of claim 1, further comprising adding at least one additional enzyme to the hydrolyzing step (iv) to reduce the amount of xylose in the hydrolyzed tobacco product.

7. The method of claim 1, further comprising evaporating the liquid comprising at least one tobacco-derived cellulosic sugar to form a condensed syrup.

8. The method of claim 7, wherein the condensed syrup comprises at least about 80% by weight glucose.

9. The method of claim 8, further comprising converting the glucose to sorbitol by hydrogenation using a nickel catalyst.

10. The method of claim 8, further comprising converting the glucose to levulinic acid by hydrolysis.

11. The method of claim 7, wherein the condensed syrup comprises about 15% by weight xylose or less.

12. The method of claim 1, further comprising adding a yeast to the hydrolyzed tobacco product and allowing the hydrolyzed tobacco product and yeast to ferment and form a fermented pulp slurry comprising glycerol.

13. The method of claim 12, wherein glycerol is produced at an average yield of at least about 10% by weight of the tobacco-derived cellulosic pulp.

14. The method of claim 1, further comprising separating the residual solids and the liquid; adding a yeast to the liquid; and allowing the liquid and the yeast to ferment and form a fermented product comprising ethanol.

15. The method of claim 1, further comprising separating the residual solids and the liquid; adding a high-protein medium to the liquid; and allowing the liquid and the high-protein medium to ferment and form a fermented product comprising lactic acid.

16. The method of claim 1, further comprising incorporating the tobacco-derived cellulosic sugars into a tobacco product.

17. The method of claim 16, wherein the tobacco product is a smoking article.

* * * * *